United States Patent
Flann et al.

(10) Patent No.: US 7,505,848 B2
(45) Date of Patent: *Mar. 17, 2009

(54) PATH PLANNER AND METHOD FOR PLANNING A CONTOUR PATH OF A VEHICLE

(75) Inventors: Nicholas Simon Flann, Smithfield, UT (US); Shane Lynn Hansen, Smithfield, UT (US); Sarah Ann Gray, Providence, UT (US)

(73) Assignee: Deere & Company, Moline, IL (US)

( * ) Notice: Subject to any disclaimer, the term of this patent is extended or adjusted under 35 U.S.C. 154(b) by 3 days.

This patent is subject to a terminal disclaimer.

(21) Appl. No.: 11/691,034

(22) Filed: Mar. 26, 2007

(65) Prior Publication Data

US 2007/0192024 A1 Aug. 16, 2007

Related U.S. Application Data

(63) Continuation of application No. 11/042,671, filed on Jan. 25, 2005, now Pat. No. 7,216,033, which is a continuation-in-part of application No. 10/403,681, filed on Mar. 31, 2003, now Pat. No. 7,010,425.

(51) Int. Cl.
*A01B 61/00* (2006.01)
(52) U.S. Cl. .................. 701/202; 340/995.19
(58) Field of Classification Search .............. 701/202, 701/23, 25, 26, 50, 209; 56/10.2 A; 172/2; 340/995.19
See application file for complete search history.

(56) References Cited

U.S. PATENT DOCUMENTS

| | | | |
|---|---|---|---|
| 4,987,383 A | 1/1991 | Mauthe | |
| 5,486,822 A | 1/1996 | Tenmoku et al. | |
| 5,528,888 A | 6/1996 | Miyamoto et al. | |
| 5,648,901 A | 7/1997 | Gudat et al. | |
| 5,684,476 A | 11/1997 | Anderson | |
| 5,751,576 A | 5/1998 | Monson | |

(Continued)

FOREIGN PATENT DOCUMENTS

CA 2 316 774 11/2001

(Continued)

OTHER PUBLICATIONS

Gray, Sarah A., Planning and Replanning Events for Autonomous Orchard Tractors [online], 2001 [retrieved on Mar. 17, 2003]. Retrieved from the Internet:<URL: http://www.autonomoussolutions.com/press.html>.

(Continued)

*Primary Examiner*—Dalena Tran

(57) ABSTRACT

In accordance with one embodiment of the invention, a path planer and method for planning a path of a vehicle defines a reference row having a reference contour in a work area. A representation of the defined reference row is established. The defined reference row comprises a curved component, a generally linear component, or both. A generator generates one or more contour rows with a tracking contour that tracks or mirrors the reference contour based on a vehicular width and a radius difference parameter associated with the curved component. The contour rows are generated by a translation technique for the generally linear component and a radius modification technique for the curved component.

22 Claims, 15 Drawing Sheets

U.S. PATENT DOCUMENTS

| | | | |
|---|---|---|---|
| 5,870,564 | A | 2/1999 | Jensen et al. |
| 5,955,973 | A | 9/1999 | Anderson |
| 5,963,948 | A | 10/1999 | Shilcrat |
| 5,974,347 | A | 10/1999 | Nelson |
| 5,978,723 | A | 11/1999 | Hale et al. |
| 5,987,383 | A | 11/1999 | Keller et al. |
| 5,995,902 | A | 11/1999 | Monson |
| 6,085,130 | A | 7/2000 | Brandt et al. |
| 6,088,644 | A | 7/2000 | Brandt et al. |
| 6,128,574 | A | 10/2000 | Diekhans |
| 6,141,614 | A | 10/2000 | Janzen et al. |
| 6,205,381 | B1 | 3/2001 | Motz et al. |
| 6,236,924 | B1 | 5/2001 | Motz et al. |
| 6,240,342 | B1 | 5/2001 | Fiegert et al. |
| 6,263,277 | B1 | 7/2001 | Tanimoto et al. |
| 6,298,303 | B1 | 10/2001 | Khavakh et al. |
| 6,336,051 | B1 | 1/2002 | Pangels et al. |
| 6,385,515 | B1 | 5/2002 | Dickson et al. |
| 6,445,983 | B1 | 9/2002 | Dickson et al. |
| 6,604,005 | B1 | 8/2003 | Dorst et al. |
| 6,615,108 | B1 * | 9/2003 | Peless et al. ............... 700/245 |
| 6,804,587 | B1 * | 10/2004 | O Connor et al. ............. 701/26 |
| 7,440,831 | B2 * | 10/2008 | Miedema et al. ............. 701/50 |
| 2002/0040300 | A1 | 4/2002 | Ell |
| 2004/0068352 | A1 | 4/2004 | Anderson |

FOREIGN PATENT DOCUMENTS

DE           100 25 829 A1     12/2001

OTHER PUBLICATIONS

Gunderson, R. W., Torrie, M. W., Flann, N. S., Neale, C. M. U., Baker, D. J., GIS and the Computer-Controlled Farm [online], Jul. 2000. Retrieved from the Internet <URL: http://www.autonomoussolutions.com/press.html>.

Gray, Sarah, Hansen, Shane, and Flann, Nick, Dynamic Replanning for Multiple Unmanned Ground Vehicles Using the Jaugs Architecture [online], Aug. 17, 2002 [retrieved on Mar. 17, 2003]. Retrieved from the Internet <URL: http://www.autonomoussolutions.com/press.html.

Gray, Sarah, What is Path Planning [online], Aug. 17, 2002 [retrieved on Mar. 17, 2003]. Retrieved from the Internet <URL: http://www.autonomoussolutions.com/press.html.

"Computer Generation of Efficient Farm Field Courses", a thesis submitted to the Faculty of Graduate Studies and Research In Partial Fulfillment of the requirement for the degree of Electrical Engineering, Faculty of Engineering, University of Regina, By Gin Liu.

Kunnayut Eiamso-ard & Howie Choset, Entitled: Sensor Based Path Planning: Three-Dimensional Exploration And Coverage; Department of Mechanical Engineering Carnegie Mellon University Aprl. 16, 1999.

Ruggero Frezza, Giorgio Picci, & Stefano Soatto, Entitled: A Lagrangian Formulation of Nonholonomic Path Following.

F. Glover, Tabu Search Part 1; ORSA Journal on Computing vol. 1 No. 3, pp. 190-206, 1989.

F. Glover, Tabu Search Part 2; ORSA Journal on Computing vol. 2 No. 1, pp. 4-32, 1990.

International Search Report dated Jul. 3, 2007.

* cited by examiner

Reference Contour Row

Transparency

Coverage Solution ic
PATH PLANNER AND METHOD FOR PLANNING A CONTOUR PATH OF A VEHICLE This is a continuation of Application Ser. No. 11/042,671, filed on Jan. 25, 2005, now U.S. Pat. No. 7,216,033, which is a contnuation-in-part of Application Ser. No. 10/403,681, filed on Mar. 31, 2003, now U.S. Pat. No. 7,010,425.

FIELD OF THE INVENTION

This invention relates to a path planner and method for planning a contour path of a vehicle.

BACKGROUND OF THE INVENTION

A path planner may be used to determine one or more path plans for a vehicle to cover a work area. The work area may represent a field for growing a crop or other vegetation. The vehicle may need to traverse the entire work area or a portion thereof to plant a crop (or precursor thereto), treat a crop (or precursor thereto), or harvest a crop, for example. If the path plan is limited to linear rows, the execution of the path plan may consume more energy than desired to traverse sloped terrain or a work area of a particular shape. Accordingly, there is a need for a system and a method for applying contour path plan for the vehicle to the work area.

SUMMARY OF THE INVENTION

In accordance with one embodiment of the invention, a path planner and method for planning a path of a vehicle defined a reference row having a reference contour in a work area. A representation of the defined reference row is established. The defined reference row comprises a curved component, a generally linear component, or both. A generator generates one or more contour rows with a tracking contour that tracks or mirrors the reference contour based on a vehicular width and a radius difference parameter associated with the curved component. The contour rows are generated by a translation technique for the generally linear component and a radius modification technique for the curved component.

DESCRIPTION OF THE PREFERRED EMBODIMENT

Figure 1:
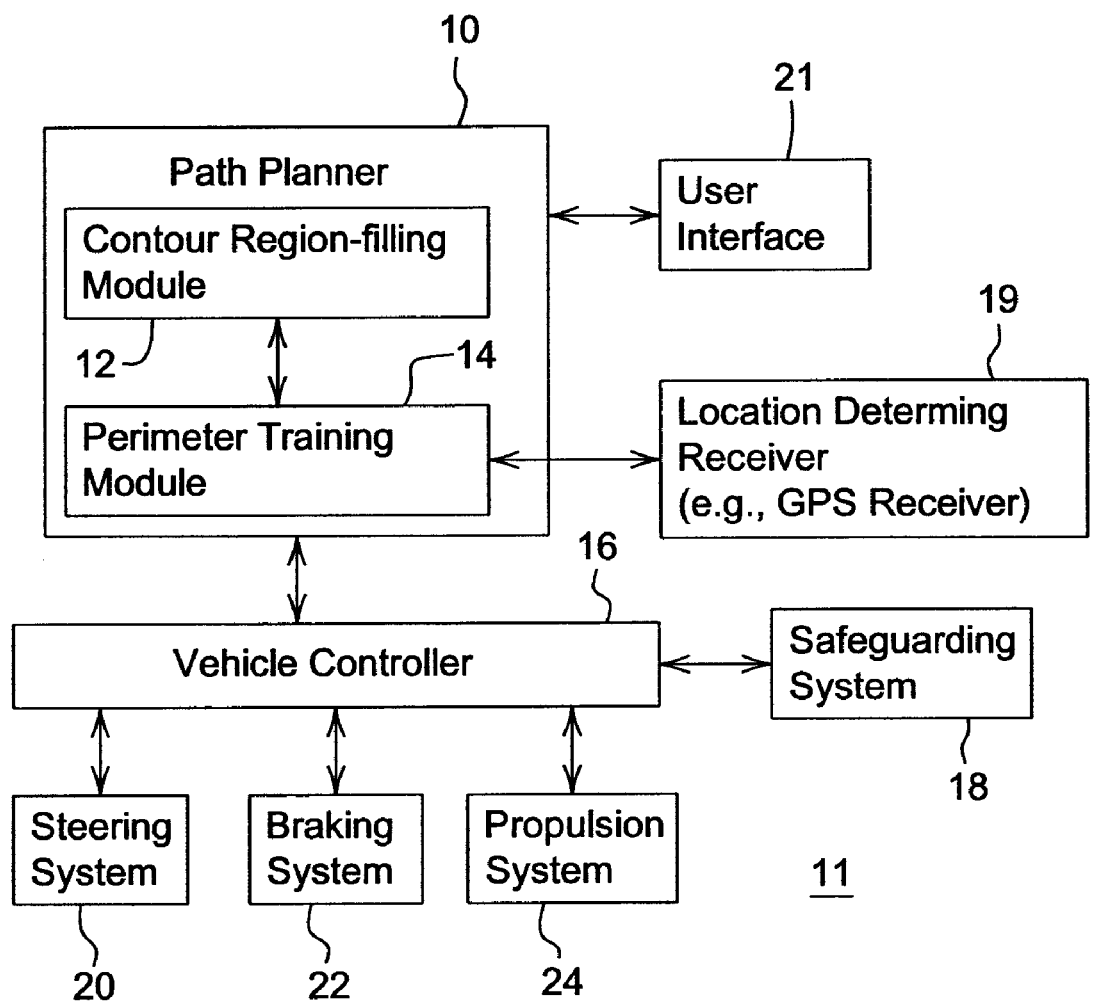
FIG. 1 is a block diagram of a path planner for planning a path of a vehicle, where the path planner is incorporated into a vehicle electronics.

In accordance with one embodiment of the invention, FIG. 1 illustrates a path planning system 11 which includes a path planner 10. The path planner 10 is coupled to a vehicle controller 16 and a location-determining receiver 19. In turn, the vehicle controller 16 is coupled to at least one of a steering system 20, a braking system 22 (if present), and a propulsion system 24 of a vehicle. The vehicle controller 16 is associated with a safeguarding system 18 that may interrupt or over-ride the path plan or path planner 10 during execution of the path plan or movement of the vehicle for safety reasons, or otherwise.

Figure 2:
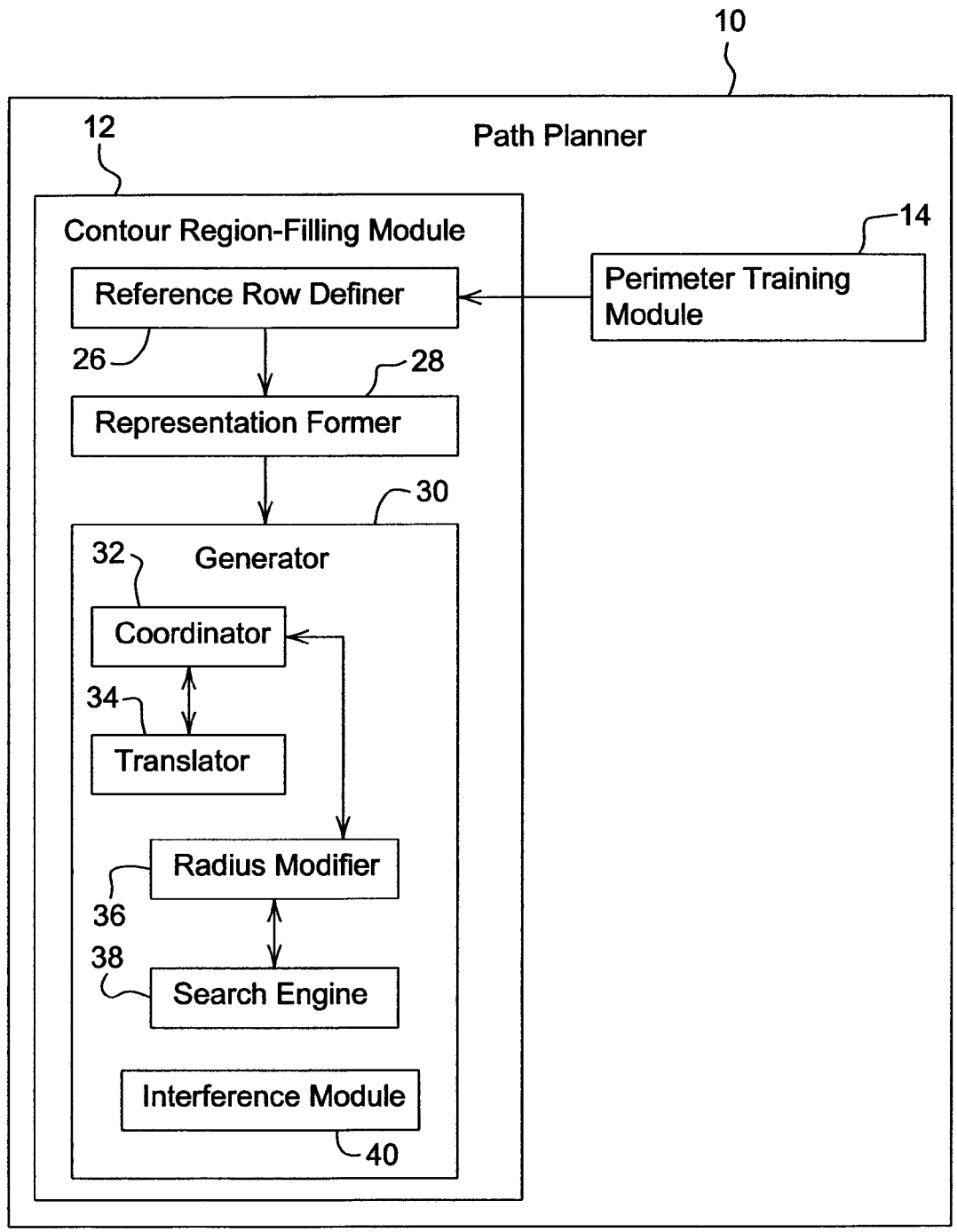
FIG. 2 is a block diagram of an illustrative path planner in greater detail than FIG. 1.

The path planner 10 of FIG. 1 comprises a perimeter training module 14 and a contour region-filling module 12. The perimeter training module 14 is arranged to collect location data on one or more points along the perimeter of the work area or a defined region within the work area. For example, the perimeter training module 14 may collect location data (e.g., Global Positioning System coordinates) from the location-determining receiver 19 (e.g., GPS receiver with differential correction). The location data is made available to contour region-filling module 12 or to the reference row definer 26 (FIG. 2).

The contour region-filling module 12 establishes a path plan comprising one or more contour rows to cover the work area or a region thereof. Although generally linear rows may be employed as part of a path plan, the path plan may be structured to support back-and-forth contour sweeps to cover a region of the work area. For certain regions of a work area, contour path plans may be more energy efficient and reduce fuel consumption over linear rows. Whether or not contour rows are more efficient than linear rows may depend upon the following: any decrease in the number of end-row turns for contour rows versus linear rows for a given proposed path plan; and any increase in the length of contour rows versus linear rows for the given proposed path plan. The decision of whether to use generally linear path plan, a contour path plan, or a combination of the linear path plan and the contour path plan is discussed in greater detail in conjunction with the embodiment of FIG. 22 and FIG. 23.

Returning to consider FIG. 1, the vehicle controller 16 accepts an input of the path plan and controls the vehicle consistent with the path plan, unless the safeguarding system 18 detects an obstacle, obstruction, hazard, safety condition, or other event that requires the vehicle to depart from the planned path, to stop movement or take evasive measures to avoid a collision with an object or living being (e.g., person or animal). The vehicle controller 16 may generate control signals for the steering system 20, a braking system 22 (if present), and a propulsion system 24 that are consistent with tracking the path plan. For example, the control signals may comprise a steering control signal or data message that is time dependent and defines a steering angle of the steering shaft; a braking control signal or data message that defines the amount of deceleration, hydraulic pressure, or braking friction applied to brakes; a propulsion control signal or data message that controls a throttle setting, a fuel flow, a fuel injection system, vehicular speed or vehicular acceleration. If the vehicle is propelled by an electric drive or motor, the propulsion control signal or data message may control electrical energy, electrical current, or electrical voltage to the electric drive or motor.

The steering system 20 may comprise an electrically controlled hydraulic steering system, an electrically driven rack-and-pinion steering, an Ackerman steering system, or another steering system. The braking system 22 may comprise an electrically controlled hydraulic braking system, or another electrically controlled friction braking system. The propulsion system 24 may comprise an internal combustion engine, an internal combustion engine—electric hybrid system, an electric drive system, or the like.

The vehicle has a vehicular width that may be defined as the greater of the width of the vehicular body or chassis or the outermost width between the outer surface (e.g., side walls) of the wheels or tires on opposite sides of the vehicle. For certain vehicles, the vehicular width may vary from the implement width, swath width, cutting width, plowing width, planting width, harvesting width, seeding width, or another task width associated with performing a task (e.g., an agronomic task, construction task, or lawn and garden task). For instance, the task width (e.g., mowing width) of a mower may depend upon the length of the rotary cutting blade or group of cutting blades. The rotary cutting blade or blades may have an effective cutting width that is more or less than the vehicular width. The safeguarding system 18 may use the greater of vehicular width and the task width (or both) to avoid collisions with objects or obstacles, whereas the path planner 10 may use the task width to establish an offset or desired overlap between adjacent paths within a work area in accordance with a path plan. The offset or desired overlap may depend upon whether a crop input or chemical is applied versus whether a harvesting or mowing operation is executed, for instance.

FIG. 2 is a block diagram of a path planner 10. The path planner 10 comprises a contour region-filling module 12. The contour region-filling module 12 includes a reference row definer 26, a representation former 28, and a generator 30. The reference row definer 26 communicates with the representation former 28. In turn, the representation former 28 communicates with the generator 30.

The definer 26 defines the reference row having a reference contour. The reference contour may be defined in accordance with various techniques that may be applied alternately and cumulatively. Under a first technique, the reference contour follows along a boundary contour of a boundary of the work area. Under a second technique, the reference contour follows along a boundary contour of the work area and the reference row is generally contiguous with the boundary. Under a third technique, the definer 26 may define a reference row that does not track a boundary of the work area.

The representation former 28 defines the reference row in accordance with one or more representations. Each representation may represent the generally linear components and generally curved components of the reference row. For example, the representation former 28 may define the arc segment as a center point, a start point, an end point and a radius, where the arc segment has a radius greater than the minimum turning radius of the vehicle. The representation former 28 may define the linear segment as two points. The start point, end point, and other points may be expressed as two dimensional or three dimensional coordinates.

The generator 30 comprises a coordinator 32, a translator 34 and a radius modifier 36 for determining a group of tracking contours that track the reference contour within a region of a work area. The translator 34 may translate or apply a translation technique to a generally linear component (e.g., a linear segment) of the reference row, whereas the radius modifier 36 may use a radius modification technique for the generally curved component (e.g., an arc segment) of the reference row to generate a group of tracking contours for the work area. In one embodiment, the radius modifier 36 selects the radius difference parameter (e.g., p) such that if the radius difference parameter generally equals the vehicular width (e.g., w), a nesting contour solution applies to adjacent contour rows of a path plan on a local basis.

The generator 30 further comprises a search engine 38 for applying a search algorithm to possible candidate values of the radius difference parameter to identify a preferential radius difference parameter. In one configuration, the search engine 38 limits the search space such that the radius difference parameter is bounded by a candidate radius difference parameter generally equal to or less than the vehicular width to reduce data processing resources required for the path planner 10, to reduce power consumption and to provide a rapid solution for vehicular guidance in accordance with a path plan. For example, the search space may be limited such that search is started with the radius difference parameter equal to the vehicular width and the radius difference parameter is decreased therefrom to find a preferential value of potential nonconformity or rule violation by the radius difference parameter.

In one embodiment, the interference module 40 identifies the presence of potential path plan formation rule violations or potential nonconformities. For example, a nonconformity or path plan formation rule violation may occur where (1) two proximate outside arcs are adjacent or separated by a linear segment in previous (e.g., an outer contour row located toward an outer boundary of the work area) and (2) a next adjacent row (e.g., an inner contour row located toward an interior of the work area) has insufficient space to fit two tracking arts that track the two outside arcs of the previous row. Accordingly, the interference module 40 may resolve the potential path plan formation rule violation or potential nonconformity by determining a single outside arc for an inner contour row that tracks the outer contour row. The inner contour row and the outer contour row represent a portion of a contour path plan for a work area. The inner contour row is located closer to an interior of the work area than the outer contour row. An outside or outer contour row refers to a contour row that is located more toward the boundary of the work area than an inner contour row. An inner arc is part of an inner contour row, whereas an outer arc is part of an outer contour row. An inside arc refers to an arc with its convex side facing an interior of the work area and an outside arc refers to an arc with its convex side facing outside of the work area. An adjacent arc refers to arcs without any intervening arc segments of material size or intervening linear segments of material length on the same contour row.

In another embodiment, the interference module 40 identifies the potential nonconformity of an inside arc and outside arc being adjacent to each other, in a contour row where such inside arc and outside arc would cross over each other; and the interference module 40 applies an iterative repair process to reformulate the contour row. An inside arc refers to an arc with its convex side facing an interior of the work area and an outside arc refers to an arc with its convex side facing outside of the work area. An iterative repair process refers to a process in which a set of rules are applied to provide a solution for adjacent contour rows that minimizes, but permits greater than previously allotted overlap between two rows for a region of the work area. The previously allotted overlap may be based on the task width or implement width. Ideally, the previously allotted overlap between adjacent contours is barely sufficient to eliminate substantially unharvested, unmowed, or unprocessed regions of the work area, whereas the greater overlap of the iterative repair process is authorized only within a confined region (e.g., a group of contour rows along a portion of their length) about the identified potential nonconformity.

Figure 3A:
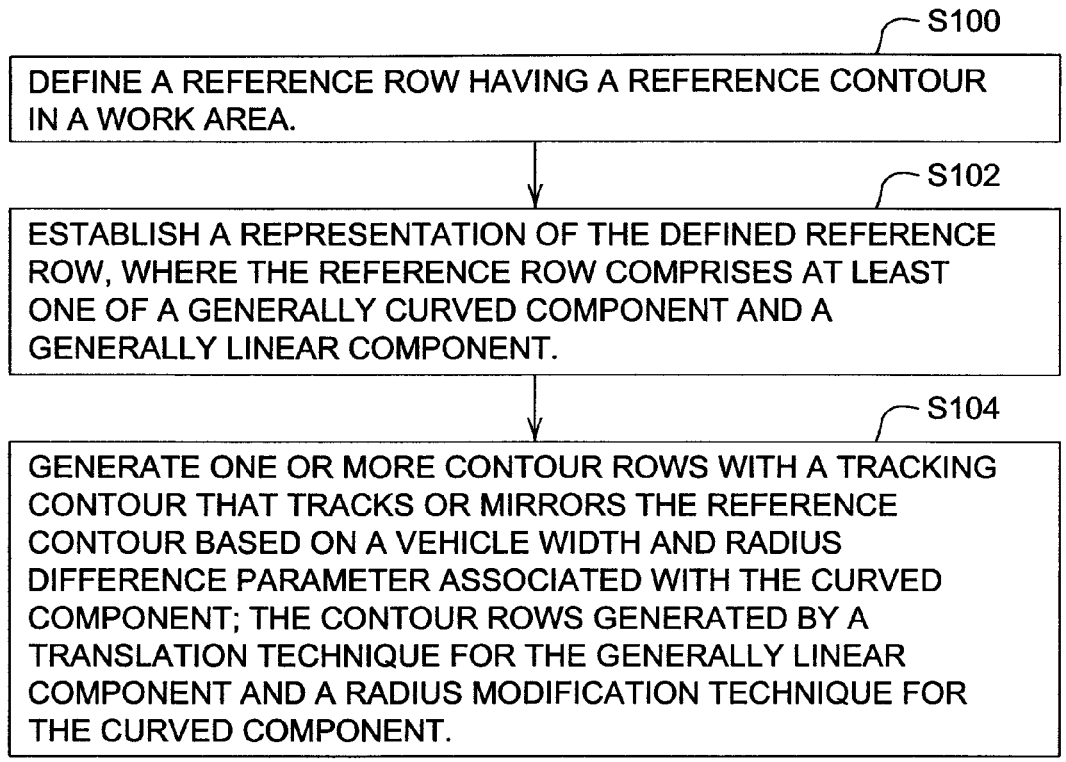
FIG. 3A is a flow chart of one embodiment of a method for generating contour rows or a path plan to cover a region.

FIG. 3A is a method for planning a path of a vehicle. The method of planning a path of a vehicle begins in step S100.

In step S100, a path planner 10 or a definer 26 defines a reference row having a reference contour in a work area. The path planner 10 or definer 26 may define the reference contour in accordance with various alternative techniques. Under a first technique, the path planner 10 or the definer 26 may define the reference row having a reference contour that follows along a boundary contour of a boundary of the work area. For example, the definer 26 may define reference location data associated with one or more boundaries of the work area to support the first technique. Under a second technique, path planner 10 or the definer 26 may define the reference row having a reference contour that follows along a boundary contour of a boundary of the work area and the reference row is contiguous with the boundary. Under a third technique, the definer 26 comprises defining a reference row that does not track a boundary of the work area.

In one embodiment, a user defines or specifies a reference contour or another initial travel row that the user wants the coverage rows to follow. The initial shape of the reference contour serves as the pattern for consecutive travel rows one or more sides of the reference contour. Contours can be used to minimize the number of end-row turns for a coverage solution. Other uses for contour shapes are to minimize the erosion of sloped areas, to minimize vehicular energy consumption, or to minimize the time to complete a work task (e.g., harvesting of a field or applying crop inputs).

In one embodiment, the reference contour forms an open shape. An open shape is defined as a shape that does not contain a loop. An open shape is also defined as a shape that does not contain a loop and does not close in on itself if one extends the reflection of the start vector and the final vector to infinity. The user interface 21 may return an error to the user via the user interface 21 for a defective reference contour or a pathological reference contour defined by a user. For instance, a defective reference contour might to prevent the path planner 10 from building contour travel rows where the neighboring arcs quickly interact in an undesired manner or violate other prohibited path formation rules.

In step S102, a representation former 28 establishes a representation of the defined reference row. The reference row comprises a generally curved component, a generally linear component, or both, regardless of the type of representation.

In step S102, the representation of the reference row may be structured in accordance with various representations, which may be applied cumulatively or individually. Under a first representation, the path segment or contour row comprises a generally linear segment associated with one or more arc segments. For example, the generally linear segment may be connected end-to-end with one or more arc segments. The contour region-filling module 12 or representation former 28 may define the arc segment as a center point, a start point, an end point and a radius, where any arc segment has a radius greater than the minimum radius. Further, the contour region-filling module 12 or former 28 may define the linear segment as two points. The start point, end point, and other points may be expressed as two dimensional or three dimensional coordinates.

Under a second representation, the path segment or contour row comprises a sequence of one or more corners. Each corner is defined with location data (e.g., coordinates) and a particular sequence for traversing the corners or location data. Under a third representation, the path segment or row contour comprises location data and a heading associated with corners or points on the path segment.

The third representation is defined by pairs of location data associated with heading data. Each pair is assigned part of a sequence or order to facilitate traversal of a particular contour path. Each pair may be associated with a critical point on a particular contour path. A critical point may be defined as a point where a material change in direction of the vehicle occurs or is planned.

In a fourth representation for carrying out step S102, the contour region-filling module 12 or the representation former 28 defines the representation as a list or a series of location data for corresponding points on the reference contour. For example, the fourth representation may represent a collection of points spaced approximately equidistantly or with a desired resolution or granularity within the work area.

In step S104, a path planner 10 or generator 30 generates one or more contour rows with a tracking contour that tracks or mirrors the reference contour based on a vehicular width and a radius difference parameter associated with the arc segment. The contour rows are generated by a translation technique for the generally linear components (e.g., linear segments) and a radius modification technique for the curved components (e.g., arc segments).

The first representation (previously described in step S102) of a contour row is well-suited for processing the linear segment in accordance with a translation technique and the arc segment in accordance with a radius modification technique to derive a group of contour rows that track each other. The second representation is well-suited for processing the corners (and linear components) in accordance with a translation technique, without the need for any radius modification, to develop the contour rows within the work area. The third representation or the fourth representation may be applied to a translation technique, a radius modification technique, or both to develop the contour rows.

The translation technique of step S104 may be carried out as follows: The vehicle minimum turning radius, the task width (w) and one contour row (e.g., reference row) are inputted as input data into the path planner 10 as a sequence of generally linear components (e.g., line segments) and curved components (e.g., arc segments). The path planner 10 or translator 34 processes the input data to produce the next contour row (or successive remaining contour rows to cover a work area) as a sequence of generally linear components (e.g., linear segments), curved components (e.g., arc segments), or both. The next row, if produced, is selected to (a) minimize the local overlap with the input row (e.g., adjacent row or immediately preceding row), unless necessary to resolve a potential nonconformity or plan formation violation; (b) not to leave any gaps with the input row (e.g., adjacent row or immediately preceding row); and (c) never create an arc or curved portion whose associated radius is less than the minimum turning radius of the vehicle. The next row should be drivable by the vehicle given its constraints and geometrically or physically possible to execute, as defined by rules or conditions (e.g., if-then statements).

The translation technique iterates to generate one or more next rows until the new next row produced would be outside the work area. The iterations are used to fill a first region of the work area that lies on at least one side of the original reference row. The first region is filled with a first set of contour rows. If the second region or other side of the reference row is not filled with contour rows, the above translation technique is applied again as described above to provide a second set of contour rows. The reference row, the first set of contour rows, the second set of contour rows and interconnected turns form a complete contour coverage pattern.

In accordance with the radius modification technique, if the radius difference parameter generally equals the vehicular width, a translation or nesting solution applies to adjacent rows on a local basis. However, if the radius difference does not equal the vehicular width, a translation or nesting solution does not apply to the adjacent rows and the following radius modification technique is applied to the curved components of the reference row. The radius modification technique comprises using the process which is more fully described in conjunction with FIG. 16.

Figure 3B:
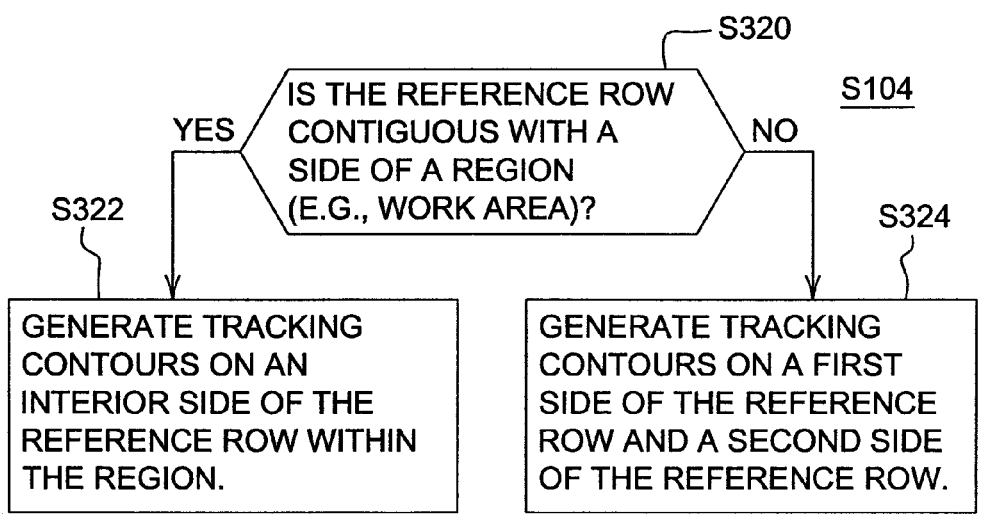
FIG. 3B is a flow chart that illustrates step S104 of FIG. 3A in greater detail.

FIG. 3B is a procedure for carrying out step S104 of FIG. 3A. The procedure of FIG. 3B starts in step S320.

In step S320, a data processing system or path planner 10 determines if the reference row is contiguous with a side of a region (e.g., the work area). If the reference row is continuous with a side of the region (e.g., work area), the procedure continues with step S322. However, if the reference row is not contiguous with a side of the region, the procedure continues with step S324.

In step S322, the path planner 10 or generator 30 generates tracking contours on an interior side of the reference row within the region.

In step S324, the path planner 10 or generator 30 generates tracking contours on a first side of the reference row and a second side of the reference row to cover the entire region (e.g., work area), less obstacles or keep-out zones.

Figure 3C:
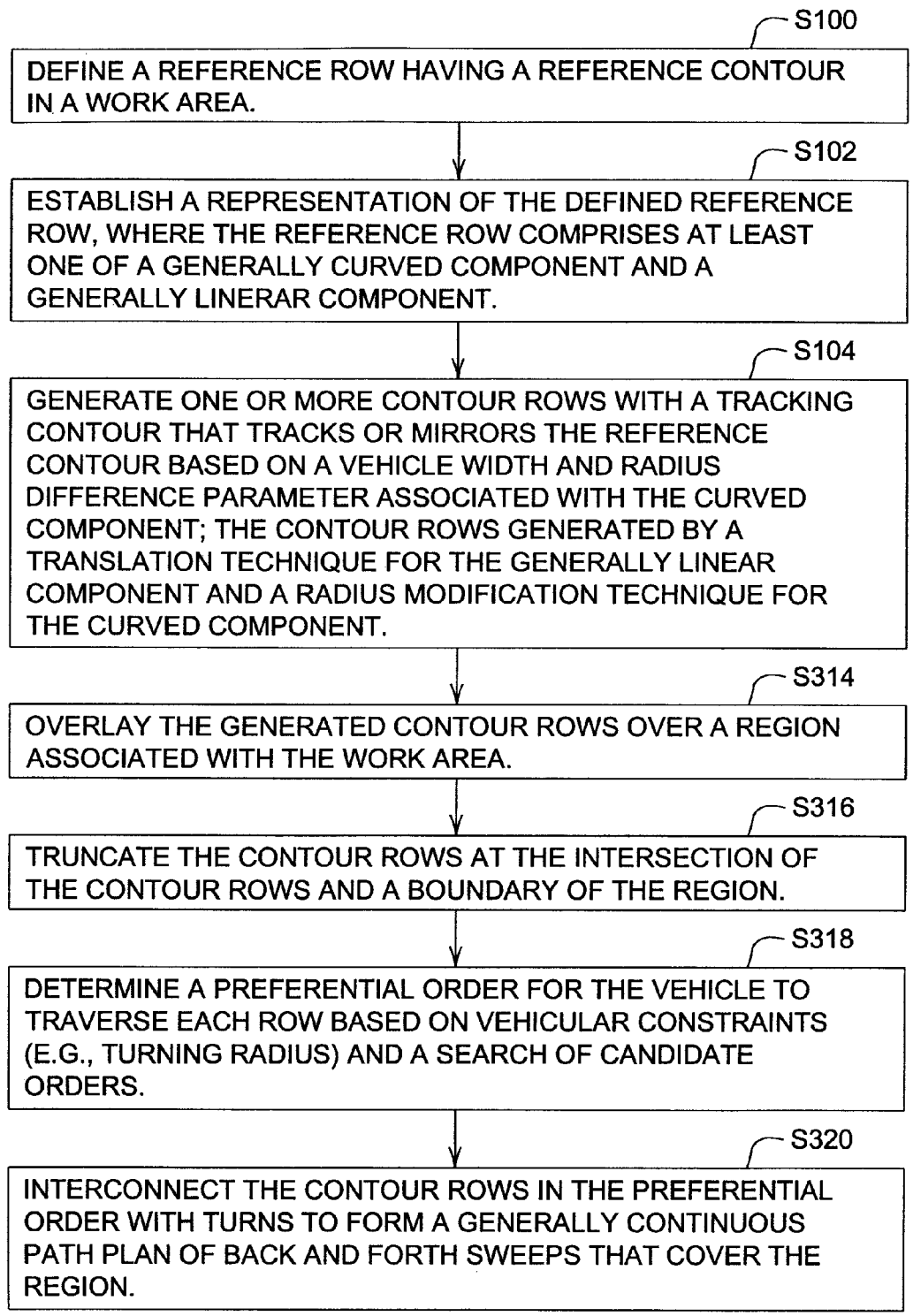
FIG. 3C is a flow chart of another embodiment of a method for generating contour rows or a path plan to cover a region.

The method of FIG. 3C is similar to the method of FIG. 3A, except FIG. 3C further includes steps S314, S316, S318, and S320. Like reference numbers in FIG. 3A and FIG. 3C indicate like procedures or techniques.

In step S314, the path planner 10 or generator 30 overlays the generated contour rows over a region associated with the work area. The region may be located within the work area. In one illustrative example, the boundaries of the region may be coextensive with the boundaries of the work area.

In step S316, the path planner 10 or generator 30 truncates the contour rows at an intersection of the contour rows and a boundary of the region.

In step S318, the path planner 10 or generator 30 determines a preferential order for the vehicle to traverse each row based on vehicular constraints (e.g., turning radius) and based on a search of candidate orders or candidate sequences. For example, the path planner 10 may select the preferential order to reduce or minimize energy consumption, fuel consumption, estimated total path distance, or estimate total path completion time.

In step S320, the path planner 10 or generator 30 interconnects the contour rows in the preferential order with turns to form a generally continuous path plan of back and forth sweeps that cover the region.

Figure 4:
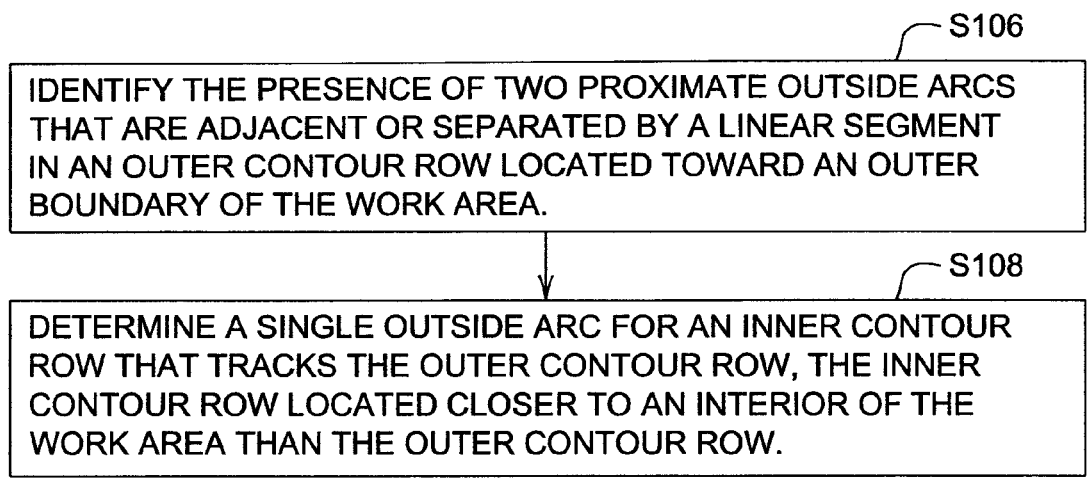
FIG. 4 is a flow chart of a first procedure for generating contour rows to resolve interference within a contour row of a contour path plan.

FIG. 4 is a procedure for managing a potential nonconformity or prohibition of a path formation rule. Here, the potential noncomformity comprises interference between two proximate (e.g. adjacent) outside arcs. An inside arc refers to an arc with its convex side facing an interior of the work area and an outside arc refers to an arc with its convex side facing outside of the work area. The method of FIG. 4 resolves interference where the configuration of tracking contour rows might otherwise lead to inefficient and sometimes impossible paths because of various interactions among the geometric constraints of the initial contour row and the minimum turning radius of the vehicle. The method of FIG. 4 begins in step S106 and may be applied during or after step S104 of FIG. 3A.

In step S106, an interference module 40 identifies the presence of two proximate outside arcs that are adjacent or separated by a linear segment in an outer contour row located toward an outer boundary of the work area. The inner contour row and the outer contour row represent a portion of a contour path plan for a work area. The inner contour row is located closer to an interior of the work area than the outer contour row. An outside or outer contour row refers to a contour row that is located more toward the boundary of the work area than an inner contour row. An inner arc is part of an inner contour row, whereas an outer arc is part of an outer contour row. An adjacent arc refers to arcs without any intervening arc segments of material size or intervening linear segments of material length (e.g., greater than a define threshold length) on the same contour row.

In step S108, the interference module 40 determines a single outside arc for an inner contour row that tracks the outer contour row, the inner contour row located closer to an interior of the work area than the outer contour row. The signal outside arc replaces, in effect, the potential use of two outside arcs (in the inner contour row) that track the outer contour row.

The above algorithm for producing the next contour row can be iteratively applied to compute the complete contour coverage path. Where geometric constraints between adjacent arcs cause interference or where the translation technique, and radius modification techniques do not resolve the interference, the method of FIG. 4 may be applied.

Figure 19:
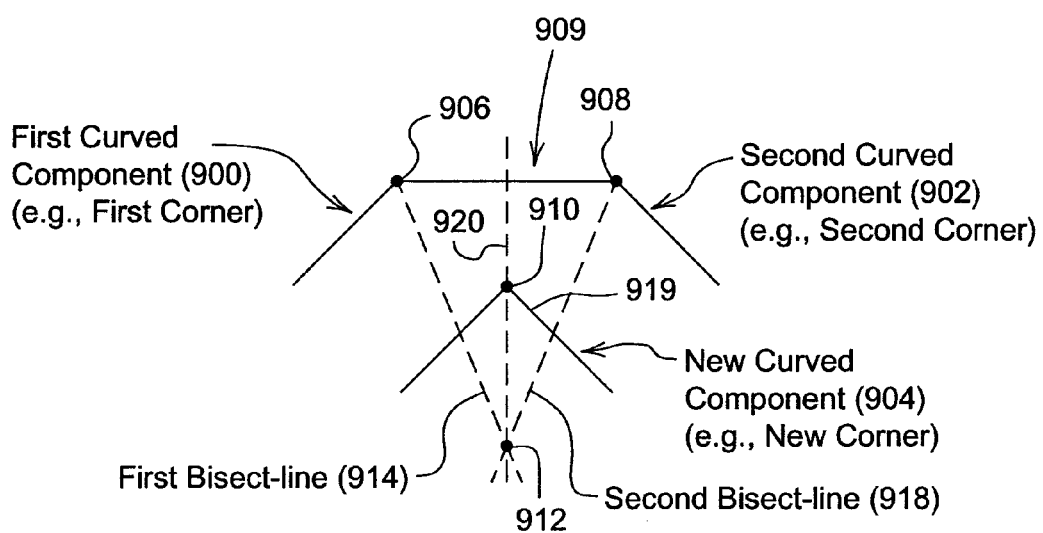
FIG. 19 is an illustrative example of the resolution of potential interference associated with two proximate outside corners.

Referring to FIG. 4 in combination with FIG. 19, an outside curve-outside curve interference is addressed. This problem arises where two adjacent outside curved components (e.g., arc segments or corners) converge together and there is no longer room to fit both curved components in the contour row. As illustrated in FIG. 19, the bisect-lines (e.g., first bisect line 914 and a second bisect line 918) of the corresponding curved components (e.g., first curved component 900 and second curved component 902) intersect. The intersection point associated with the intersection of the bisect lines may be referred to as the bisect-line intersection point 902. The problem of interference between two adjacent outside curved components is detected whenever the center-point (e.g., coincident a radius of the curved component or arc segment) of a curved component (e.g., or estimated radius of a corner) crosses over inwardly and goes beyond inwardly with respect to the bisect-line-intersection point 912.

If the above outside-outside interaction is detected between an iteration of the translation of a contour or a procedure for determining a next contour row, the interference module 40 or path planner 10 corrects or resolves the interference by replacing the two interacting curved components (e.g., corners) with a single curved component 904 (e.g., corner). This process is referred to as subsuming corners and is illustrated in FIG. 19. The new single curved component 904 (e.g., corner) will lie along a new bisect-line 920 that intercepts the bisect-line intersection point 912. For example, the next contour may comprise a corner with a vertex 910. The radius of the new corner is estimated to minimize the overlap to the previous row. The above corrective process of subsuming corners may occur multiple times, depending upon the complexity of the originating reference row.

Figure 5:
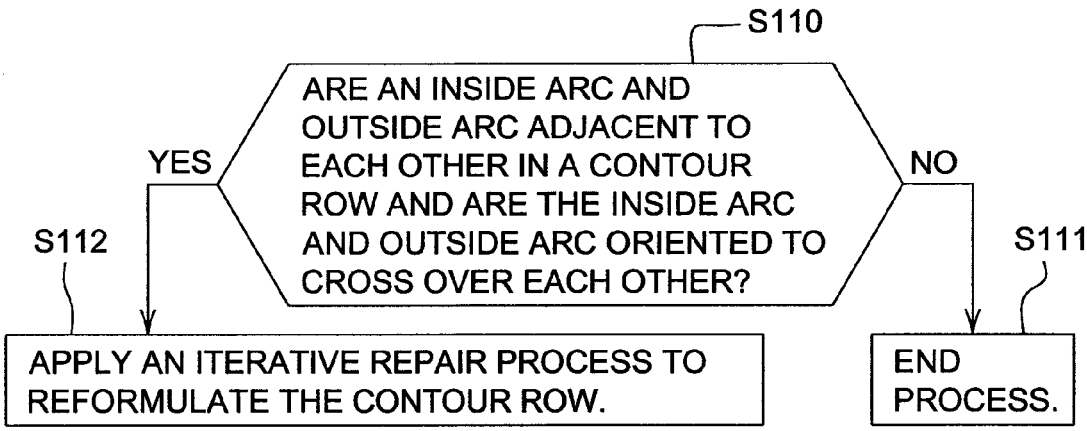
FIG. 5 is a flow chart of a second procedure for generating contour rows to resolve interference within a contour row of a contour path plan.

FIG. 5 is a procedure for managing interference between an adjacent inside arc and outside arc. An inside arc refers to an arc with its convex side facing an interior of the work area and an outside arc refers to an arc with its convex side facing outside of the work area. The method of FIG. 5 resolves interference where the configuration of tracking contour rows might otherwise lead to inefficient and sometimes impossible paths because of various interactions among the geometric constraints of the initial contour row and the minimum turning radius of the vehicle. The method of FIG. 5 may be applied simultaneously with or following step S104 of FIG. 3A. The method of FIG. 5 begins in step S110.

In step S110, the path planner 10 or interference module 40 identifies the presence of the following two conditions. Under a first condition, an inside arc and outside arc are adjacent to each other, or interwined in a contour row. Under a second condition, an inside arc and outside arc would cross over each other. If both of the foregoing conditions are present, the method continues with step S112. Otherwise, the process of FIG. 5 ends in step S111.

In step S112, the interference module 40 applies an iterative repair process to reformulate the contour row. The iterative repair process may amount to the relaxation or local suspension of a desired overlap between adjacent rows or a select region, while maintaining the desired overlap elsewhere in the work area. The path planner may change the parameters of the offending contour row (and even adjacent rows) and tries another solution iteratively on a trial-and-error basis or in accordance with a search algorithm until suitable resolution is achieved.

Figure 20:
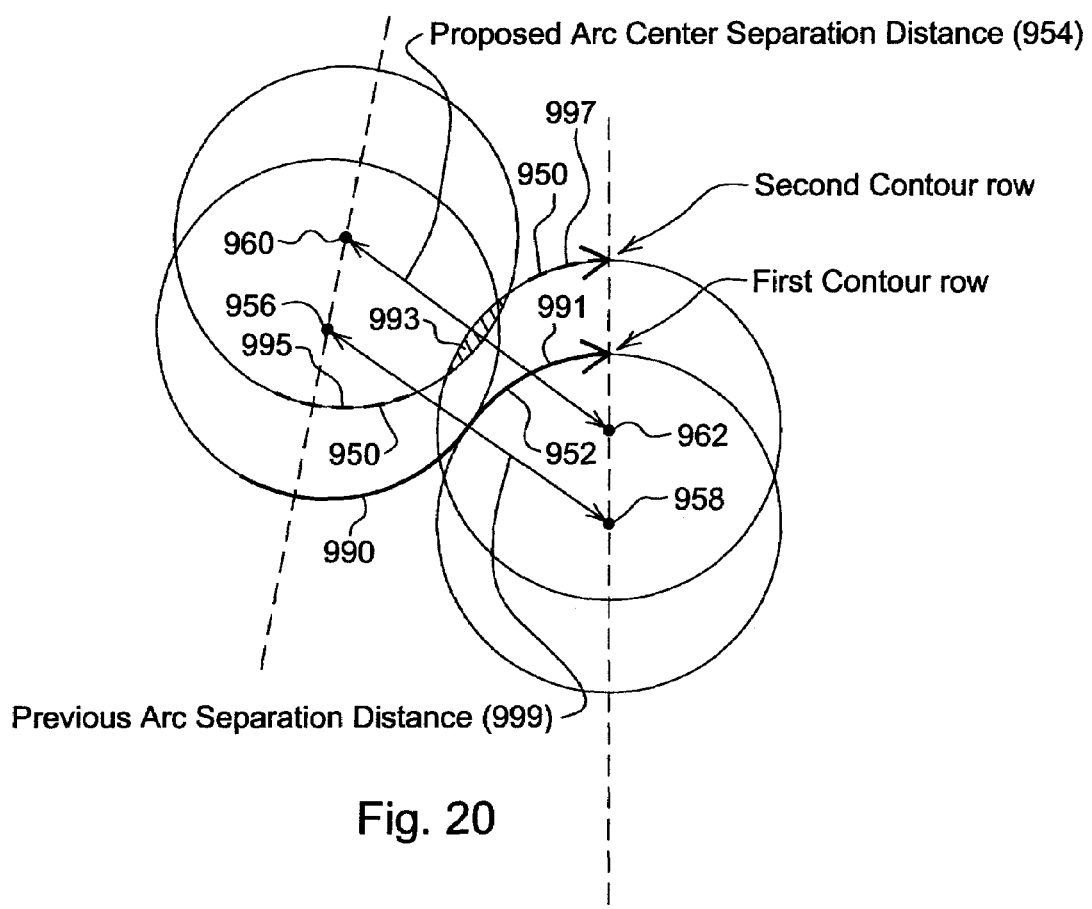
FIG. 20 is an illustrative example of the identification of an outside corner-inside corner interference.

Referring to FIG. 5 and FIG. 20, an interference between an inside curved component and outside curved component is addressed for the establishment of a new contour row based on a previous contour row or reference contour. The interference condition is illustrated in FIG. 20 where an inside arc segment 991 and an outside arc segment 990 approach each other in a first contour row 952 while the room to fit both arcs is being reduced each iteration or successive row (e.g., second contour row 950) of the path plan. The interference problem, illustrated in FIG. 20, is detected prior to or when the path planner attempts to connect the two transition points associated with two corresponding curved components (e.g., arc segments) with a smooth path. Because the path planner does not wish to create arcs that loop over and cross each other (as indicated by the cross-hatched section labeled 993), the path planner is instructed or programmed to address the interference as described in conjunction with FIG. 5.

Figure 6:
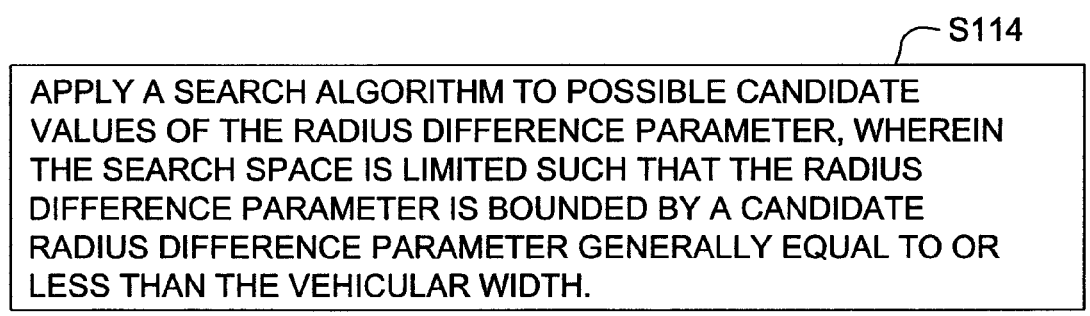
FIG. 6 is a flow chart of a method for generating contour rows pursuant to a search algorithm for searching candidate radius difference parameters to identify a preferential radius difference parameter.

FIG. 6 is a procedure for searching for a radius that may be applied in accordance with the radius modification technique in step S104 of FIG. 3. Step S114 may be executed simultaneous with or after step S104, for example.

In step S114, a generator 30 or search engine 38 applies a search algorithm to possible candidate values of the radius difference parameter, wherein the search space is limited such that the radius difference parameter is bounded by a candidate radius difference parameter generally equal to or less than the vehicular width. Given an initial reference row, there are many possible contour paths that could be produced from it. In the approach outlined here, a hybrid of translation and radius modification (e.g., where nesting paths are a special case of radius modification) are created. The radius modification is controlled by a radial spacing parameter (p), which is the difference in the radius between corresponding arc segments. Ideally, the paths should be produced with the radial spacing parameter (p) set to the vehicular width (w), so that overlap between adjacent rows is minimized and a nesting contour solution applies. However, these solutions are often not possible due to the combined geometric constraints of minimum-turning radius, and the interactions of adjacent arcs segments.

The algorithm uses a combination of generate-and-test and iterative repair to find a complete solution that satisfies the geometric constraints while minimizing the overlap. A search is made through the space of possible values of p for each corner in the initial contour row. If there are n initial corners and p is fixed as an integer, there will be approximately $O(w^n)$ possible combinations because p can vary between 0 and the vehicular width (w). Where p is equal to zero, the path planner instructs the vehicle to execute a totally redundant pass of the vehicle over the same path or previous contour.

Rather than searching all possible combinations, an iterative greedy method may be used for the sake or efficiency and reduction of data processing resources. Each corner is individually optimized, by setting its p value to width and decreasing it until a valid solution is found. The largest value without failure is used in the final solution. The method proceeds by optimizing each corner individually until all the corner p values have been set. The solution with the greatest p values is returned, since this will necessarily minimize the overlap and provide an efficient contour path plan for the vehicle.

FIG. 7 through FIG. 12 illustrate various contour path plans in which alternating rows or adjacent contour rows are shown as unshaded strips 705 and shaded strips 707.

Figure 7:
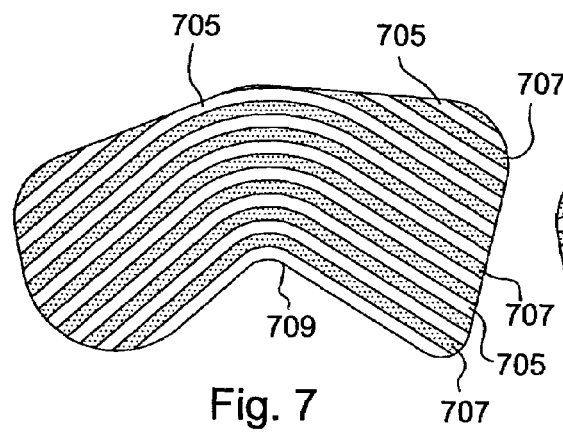
FIG. 7 is a top view of a first illustrative path plan where a reference row is aligned with a bottom border or boundary of the work area and where the turns at the end of the rows are omitted solely to simplify the drawing.

FIG. 7 is top view of a first illustrative path plan or contour path plan including a contour row aligned with a bottom border 709 or boundary of the work area. Although turns between different or adjacent rows are not shown, it is understood that turns at the end of the rows are omitted solely to simplify the FIG. 7. In one example, the contour path plan of FIG. 7 tracks a reference row associated with or FIG. 7 shows a contour path plan that tracks a reference row associated with or coextensive with a lower boundary of the work area.

Figure 8:
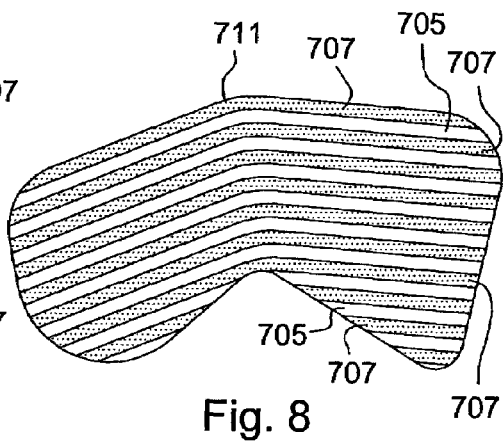
FIG. 8 is top view of a second illustrative path plan where a reference row is aligned with a top border or boundary of the work area and where the turns at the end of the rows are omitted solely to simplify the drawing.

FIG. 8 is top view of a second illustrative path plan or contour path plan including a contour row aligned with a top border 711 or boundary of the work area. Although turns between different or adjacent rows are not shown, it is understood that turns at the end of the rows are omitted solely to simplify the drawing. In one example, the contour path plan of FIG. 8 tracks a reference row associated with or coextensive with an upper boundary of the work area.

Figure 9:
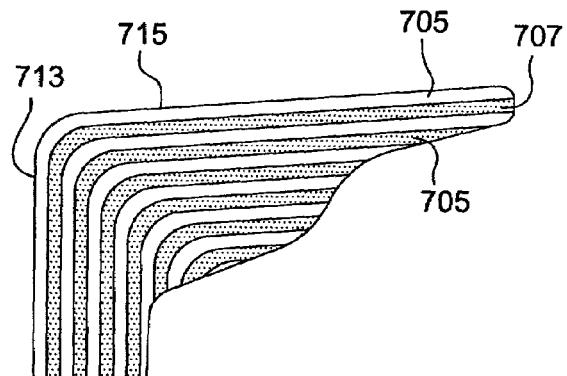
FIG. 9 is a top view of third illustrative path plan where a reference row is aligned with a left and top border or boundary of the work area and where the turns at the end of the rows are omitted solely to simplify the drawing.

FIG. 9 is top view of a third illustrative path plan or contour path plan where a contour row is aligned with a left border and top border 715 or boundary of the work area. Although turns between different or adjacent rows are not shown, it is understood that turns at the end of the rows are omitted solely to simplify the drawing. In one example, the contour path plan of FIG. 9 tracks a reference row associated with the left and top border or boundary of the work area.

Figure 10:
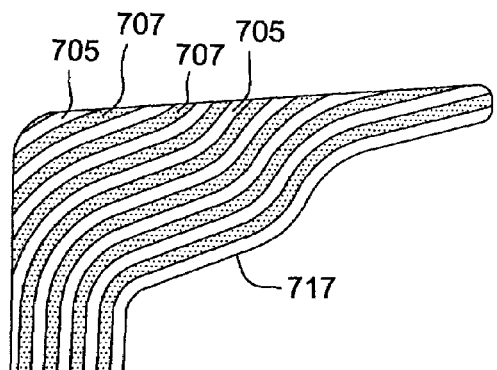
FIG. 10 is top view of a fourth illustrative path plan where a reference row is aligned with a right wavy diagonal border of the wok area and where the turns at the end of the rows are omitted solely to simplify the drawing.

FIG. 10 is top view of a fourth illustrative path plan where a contour row is aligned with a right wavy diagonal border 717 of the work area and where the turns at the end of the rows are omitted solely to simplify the drawing. In one example, the contour path plan of FIG. 10 tracks a reference row associated with a wavy border or boundary of the work area.

Figure 11:
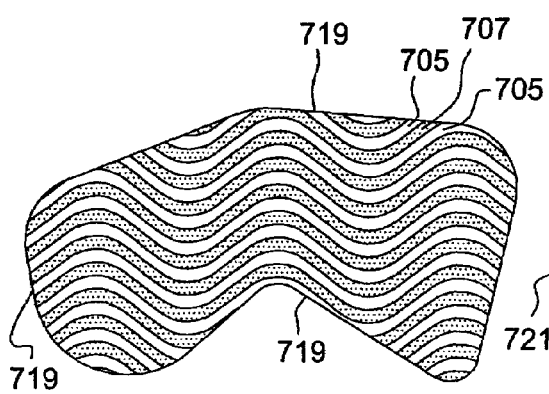
FIG. 11 and FIG. 12 are top views of a fifth illustrative path plan and a sixth illustrative path plan, respectively, where a reference contour of a reference row is unrelated to a border contour of the work area.
Figure 12:
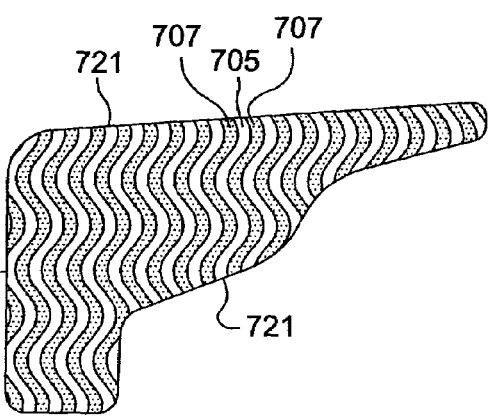

FIG. 11 and FIG. 12 are top views of a fourth illustrative path plan and a fifth illustrative path plan, respectively, where a reference contour of a reference row or contour row is unrelated to a border contour (e.g., 719 or 721) of the work area. The path planning system and method is flexible such that the path plans of FIG. 7 through FIG. 12, are possible, among other path plans or contour path plans.

Figure 13:
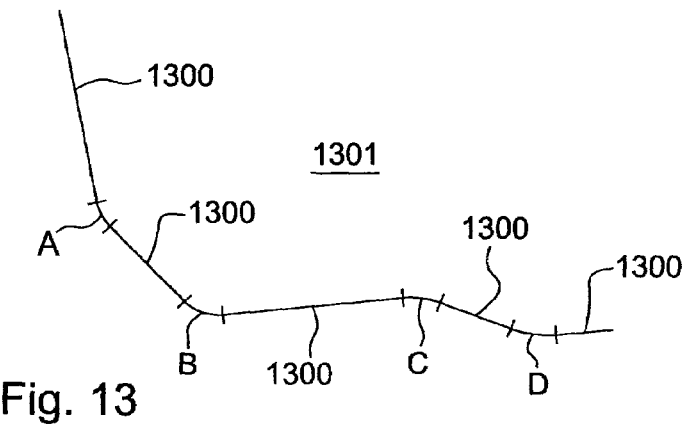
FIG. 13 is a diagram of an illustrative contour reference row in accordance with the invention.

FIG. 13 is a diagram of an illustrative contour reference row 1301 in accordance with the invention. In FIG. 13, a reference row represents a contiguous sequence of arc segments (A, B, C, and D) and generally linear segments 1308 consistent with the first representation of the reference contour. Each arc segment may be defined by a radius, a beginning point, an end point, and a center point, for instance.

Figure 14:
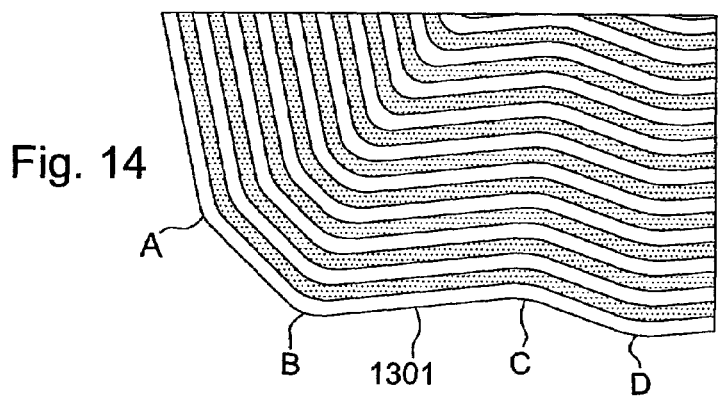
FIG. 14 is a diagram of a path plan derived from the illustrative contour reference row of FIG. 13.

FIG. 14 is a diagram of a path plan derived from the illustrative contour reference row 1301 of FIG. 13. The contour path plan computed from the reference row 1301 of FIG. 13 may use any of the embodiments and procedures disclosed in this document. The turns at the end of rows are omitted in FIG. 14 to simplify the illustration.

In FIG. 14, because the inside region or interior of the work area is above the reference row, arcs A, B and D are referred to as outside arcs, while arc C is an inside arc. An inside arc refers to an arc with its convex side facing an interior of the work area and an outside arc refers to an arc with its convex side facing outside of the work area.

Figure 15A:
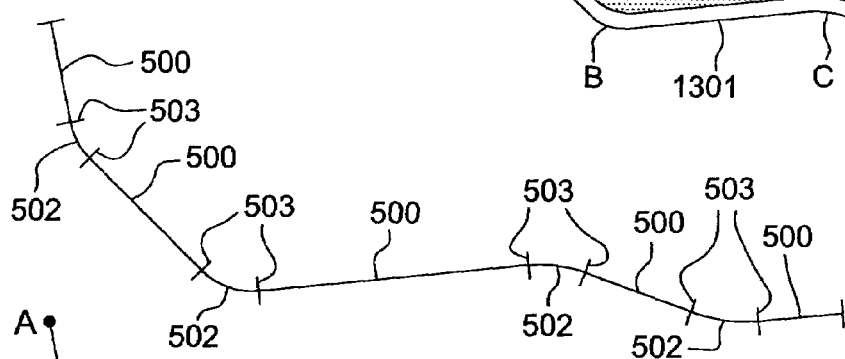
FIG. 15A is a first representation of a contour row in accordance with generally linear segments and arc segments.
Figure 15B:
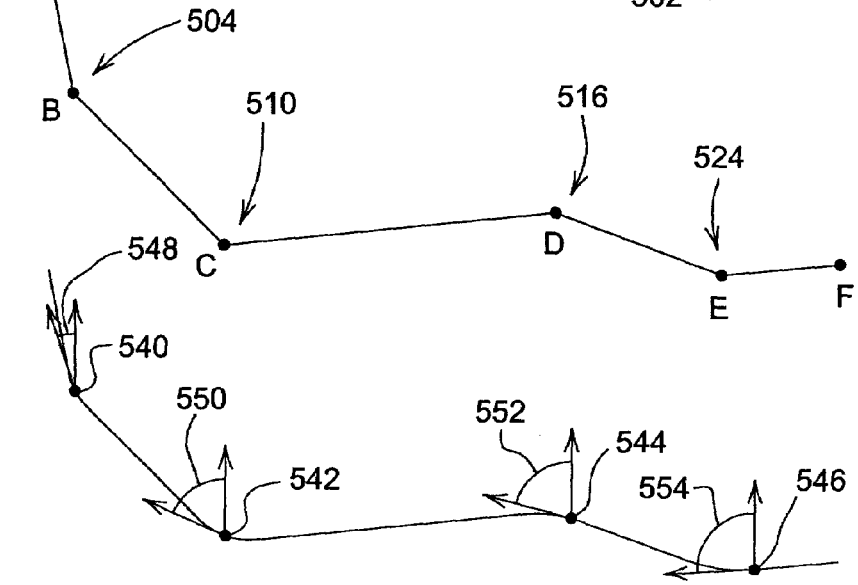
FIG. 15B is a second representation of a contour row defined by one or more corners.
Figure 15C:
FIG. 15C is a third representation of a contour row defined by a transition sequence.

FIG. 15A and FIG. 15C represent alternative representations of reference contours, contour rows, or tracking contours. Each reference contour may be associated with a linear component, a curved component, or both, regardless of the applicable representation. The set of flexible representations for contour rows are illustrated in FIG. 15A through FIG. 15C, inclusive. The representations include the following: (1) a first representation comprising linear segments 500 and arc segments 502 in FIG. 15A (2) a second representation comprising corners, and (3) a third representation comprising a transition sequence. The first representation, the second representation and the third representations support a translation technique (and nesting operations).

FIG. 15A is a first representation of a contour row in accordance with linear segments 500 and arc segments 502. The linear segments 500 and arc segments 502 are oriented end for end. Each linear segment 500 may be defined by the coordinates (e.g., two dimensional or three dimensional coordinates) of two points. Each arc segment 502 may be defined by the coordinates of a starting point, an ending point, a center point and a radius. Further, each arc segment 502 may have a direction of travel or rotation. The first representation supports a radius modification technique in a convenient and readily accessible manner. For each arc segment, the perpendicular offset between adjacent contour rows is generally calculated such that no gap will be left between corresponding arcs of adjacent rows. The sequence of linear segments 500 and arc segments 502 must be contiguous and the radius of the arc segments 502 must be greater or equal to the minimum turning radius of the vehicle.

FIG. 15B depicts a second representation of the contour row or reference row by a sequence of corners (504, 510, 516, and 524). Each corner may be defined by one or more corner points (e.g., in two dimensional or three dimensional coordinates). Each corner (504, 510, 516, and 524). may be defined by a vertex point and two outlying points spaced apart therefrom. Accordingly, a first set of three associated corner points (A, B, and C) forms a first corner 504; a second set of corner points (B, C, and D) forms a second corner 510; a third set of corner points (C, D and E) forms a third corner 516; and a fourth set of corner points (D, E and F) forms a fourth corner 524.

The sequence of corners (504, 510, 516 and 524) are generally contiguous. Each corner may be used to describe or represent the equivalent of a single arc in the first representation, for example. Corners may contain additional properties including an inside flag (indicative of an inside corner) or outside flag (indicative of an outside corner), the radius of the arc, and the difference in radii between a corner (of a previous row) and a next corner (of a next row). For an outside corner, the convex side of the corner faces generally outward toward an edge of the work area.

A series of steps are required to generate the next adjacent row in accordance with a translation technique. Under one translation technique, first the translator 34 or path planner 10 converts the provided reference row in accordance with a first representation (e.g., linear segments and arc segments) to its equivalent representation as a second representation (e.g., corners). For example, one or more arcs are converted to equivalent or corresponding corners. Second, the translator 34 or path planner 10 translates the second representation into a contour path plan for at least a portion of the work area.

FIG. 15C is a third representation of a contour row in accordance with a transition sequence. FIG. 15C shows transitions. A transition is a representation of an instantaneous moment on the path and its principal attributes including its location (as a point) and its direction (as a unit vector). The transition may be defined in polar coordinates. Other properties include the radius of the associated arc and the rotation direction at the location. As illustrated in FIG. 15C, a first transition has a first transition location 540 and a first transition direction 548 or heading; a second transition has a second transition location 542 and a second transition direction 550 or heading, a third transition has a third transition location 544 and a third transition direction 552 or heading; and a fourth transition has a fourth transition location 554 and a fourth transition direction or heading. The transition locations may be defined by two or three dimensional coordinates, whereas the transition direction may be defined as angles.

Figure 16:
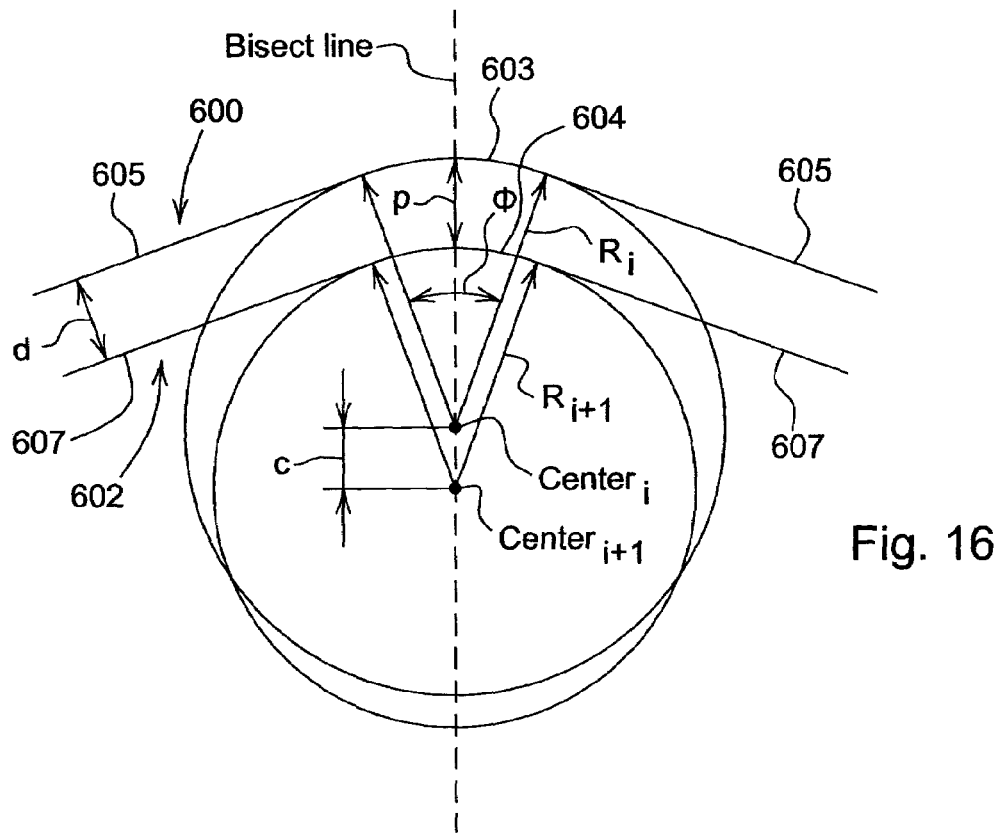
FIG. 16 is an example of generation of a next contour row associated with an arc of a previous contour row.

FIG. 16 is an example of generation of a next contour row 602 associated with a previous arc segment 603 and a previous linear segment 605 of a previous contour row 600. Here in the example of FIG. 16, the linear segments (e.g., 605, 607) for adjacent rows may be determined by translation in the amount of perpendicular offset (d). The perpendicular offset (d) is the required perpendicular offset distance needed so that no gap is left between the two adjacent contour rows. The distance d may be based upon the task width of the vehicle as previously described. However, where multiple vehicles are present and multi-vehicle collision avoidance is required, the distance d may also consider greater the task width and the body of wheel-base width. Further, the perpendicular offset may be altered by an offset overlap allowance to allow adjacent task widths to overlap slightly where a harvesting or cutting of vegetation or crop is performed, or where an iterative repair process is applied on a local basis within the work area.

Figure 17:
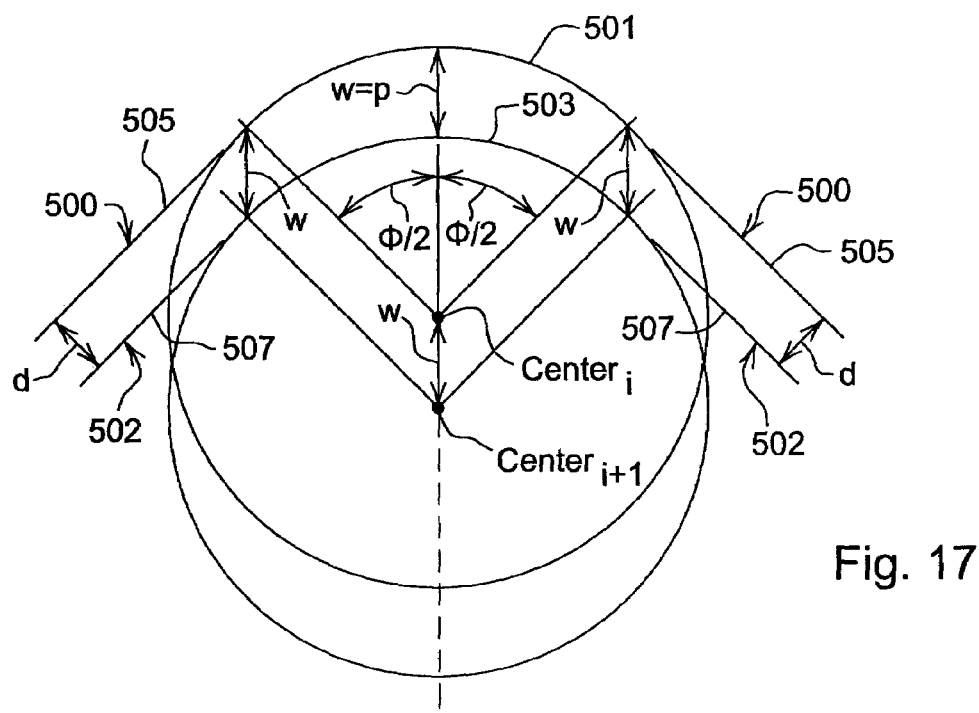
FIG. 17 is an example of a contour translation associated with the generation of a next contour row associated with an arc of a previous contour row, where nesting contour applies.

For the arc segment 603, a simple contour translation will apply to form the next arc segment 609 only under certain conditions (e.g., where w=p as described in FIG. 17). For the general case, a radius modification is required such that if the previous row 600 is the upper or outer row, the next row 602 has a radius reduction (c) in accordance with the radius modification technique. The radius reduction supports minimization of overlap between one or more curved components (e.g., 603 and 604) of the contour path plan, consistent with the translation of any adjoining linear segment (e.g., 605, 607) associated with the curved component (e.g., 603).

In one illustrative embodiment, the radius modification is determined in accordance with the following equations:

$$R_{i+1} = R_i - p;\ p = \frac{d - c*\cos(\Phi/2)}{\cos(\Phi/2)};$$

and $c=|p-w|$; and $p \leq w$; where $R_{i-1}$ is the new radius of curved component of the next row, $R_i$ is the previous radius of curved component (e.g., previous arc segment (603)) of the previous row, p is the radial spacing parameter between rows or the change in radius between $R_i$ and $R_{i-1}$, c is the radius modification distance, which means the displacement between a center point associated with a previous curved component (e.g., previous arc segment having radius $R_i$ and a next curved component (e.g., next arc segment) $R_{i-1}$, d is the required perpendicular offset distance needed between the translated linear components (e.g., so that no gap is left between the previous arc segment and the next arc segment or between adjacent linear components). $\Phi$ is the angle of the previous curved component for the previous row, and w is the vehicular width or the task width. The angle of the next arc segment 604 may be based on the difference in radii between the previous arc segment 603 and the next arc segment 504. In one embodiment, the radial spacing parameter (p) is determined by a search process described later (e.g., A* search algorithm). If the radial spacing parameter is equal to vehicular width w, then a nesting contour solution is obtained as set forth in FIG. 17 (and the perpendicular offset or row spacing (d) is approximately equal to the vehicular width (w)). However, a nesting contour solution may be locally optimal for part of a contour path, but globaly unsolvable or deficient for the complete contour path plan. By using the radial spacing parameter (p), consistent with the above equation the system and method can explore other solutions, and therefore find a globally satisfying solution.

The next row 602 of FIG. 16 may be formed from a previous row 600 by applying the third representation of FIG. 15C, for example. Once the value of the radial spacing parameter (p) (e.g., which may be set equal to the perpendicular offset distance (d) under certain circumstances), the next row can be produced by a translation technique, a radius modification technique or both with respect to the previous row (e.g., a reference row). First, the minimum value of the radial spacing parameter (p) (e.g., again p may be set equal to d, where appropriate) for all the curved components (e.g., corners) in a single row is calculated to support generally parallel rows that track each other. Alternately, each individual value of the radial spacing parameter (p) is used for each corresponding curved component. Second, a transition point is calculated for each curved component (e.g., corner) that will lie along the bisect line of FIG. 16 and along the next row. The vector of each transition point will be perpendicular to its corresponding corner's bisect-line. The radius of the transition will be $R_{i+1}$. Third, the path planner determines a new or next contour row by connecting together the transition points. For example, the path planner may use the "arc-paths" method that takes multiple transition points and produces a smooth path consisting of a curved component (e.g., an arc segment), a substantially linear component (e.g., a linear segment), and another curved component. The parameters for the arcs will be taken from the transition points (radius, vector, rotation-direction). The result will be a new contour row that satisfies the constraints.

FIG. 17 is an example of a contour translation of new arc segment 503 associated with the generation of a next contour row 502 associated with a previous arc of segment 501 of a previous contour row 500. FIG. 17 represents a simple approach to computing the contour rows based on direct geometric manipulation of the original reference row (e.g., or previous contour row 500). For example, the approach of FIG. 17 may be based on a direct translation. In this translation technique, the next contour row (e.g., next contour row 502) is computed by applying a perpendicular translation of magnitude w to the current row 500. For example, a new generally linear segment 507 is translated or spaced parallel to the original or previous linear segment 505 of a contour row by a perpendicular offset distance (d) approximately equal to the vehicular width (w). This translation technique clearly works when the rows are straight lines. However, when curved components (e.g., arc segments) are involved it is not obvious the appropriate vector or magnitude of translation required to ensure that no area is left uncovered and that the overlap between the rows is minimized, unless particular geometry constraints are satisfied (e.g., where p is substantially equal to w such that a nesting solution applies, such as set forth in FIG. 17). The approach of FIG. 17 produces workable, but inefficient, solutions with a limited set of simple reference rows. However, it is unable to effectively produce a contour coverage path such as that in FIG. 14 without incurring excessive overlapping of adjacent rows.

A radial spacing parameter (p) between the previous arc segment and the next arc segment may be defined as approximately equal to the vehicular width (w). However, the perpendicular offset between the rows, designated d, may be calculated as a function of w. In general, d may be determined in accordance with the following equation: d=(p+c) * cos (Φ2) and; d≦w, where d is the required perpendicular offset distance (e.g., selected so that no gap is left between the previous arc segment and the next arc segment), Φ is the angle of the previous arc segment for the previous row. Where, the radial spacing parameter (p) equals the vehicular width (w), the above equation may be simplified to the following equation: d=w * cos (Φ/2).

Figure 18:
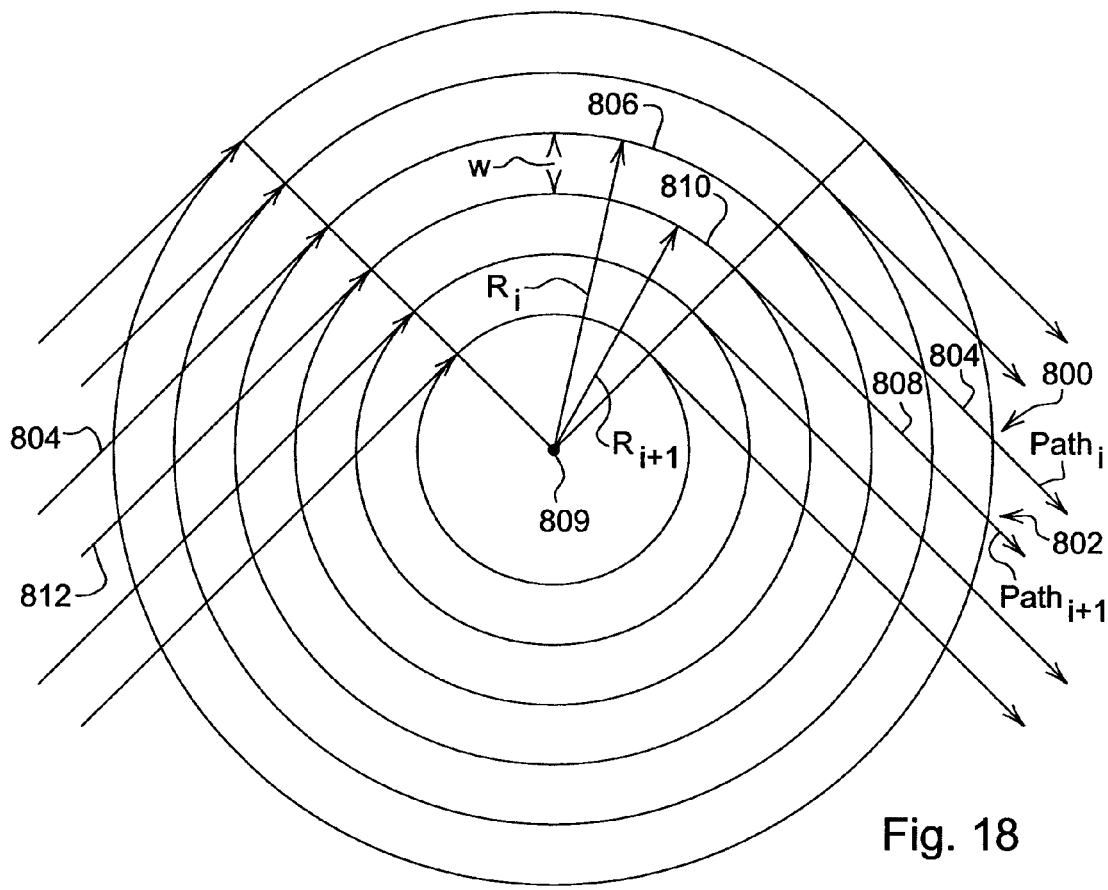
FIG. 18 is an example of nesting contour associated with the generation of multiple next contour rows associated with an arc of a previous contour row.

FIG. 18 is an example of nesting contour associated with the generation of multiple next contour rows associated with an arc of a previous contour row. FIG. 18 represents an iterative application of the process applied in FIG. 17. FIG. 18 represents a simple geometric approach that is well suited to simple arc paths and uses nesting (e.g., translation) rather than radius modification. In this approach, the outer adjacent row to an inside arc (not shown) has its radius increased by the vehicular width (w) (or p=w) while using the same center point 809. Conversely, the inner adjacent row 802 to an outside arc 806 has its radius decreased by vehicular width (w) while using the same center point 809. This method can produce contour path plans that minimize the number of rows needed with no overlap or missed areas. However, its applicability is generally limited to simple cases of contour path plans. Unsolvable problems occur when the radius of outside arcs is reduced to the minimum drivable radius or when adjoining arcs interfere with each other as the radii are changed as in FIG. 19 or between an outside and inside arc as in FIG. 20.

Because of the significant restrictions of the simple translation or nesting approach of FIG. 18, the region-filling module 12 or path planner 10 uses a hybrid approach that combines the advantages of translation and nesting, while overcoming their limitations.

FIG. 19 is an illustrative example of the resolution of a first outside-curved component 900 interfering with a second outside curved component 902 (e.g., interfernce between two outside-corners). An outside curved component (e.g., 900 or 902) has its convex side facing the outer boundary of the region or work area. In FIG. 19, an inner contour row 919 (e.g., here, the lower contour row) is determined based on an outer contour row 909 (e.g., here, the upper contour row) that includes a first curved component 900 (e.g., a first corner) and a second curved component 902 (e.g., a second corner) with the potential presence of an intervening generally linear component. The generally linear component may be located where the outer path contour 909 intersects with the bisect line 920. The path planner 10 replaces the first curved component 900 and the second curved component 902 in the previous row 909 with a single new curved component 904 for in the next contour row 919 or inner contour row. A critical point 910 of the single curved component 904 is estimated based on the critical points (906, 908) of the first curved component 900 and the second curved component 902 with respect to a first bisect line 914 and a second bisect line 918. A procedure for resolving the interference of between the outside curved components (900 and 902) of FIG. 19 is discussed earlier in conjunction with the description of FIG. 4.

FIG. 20 is an illustrative example of the resolution of an interference between an outside curved component 990 and an inside curved component 991. For example, FIG. 20 is an illustrative example of the resolution of outside corner-inside corner interference (illustrated by the interference region or hatched region 993). A potential nonconformity or path formation prohibition is identified if (1) proposed arc center separation distance 954 between two curved components (995, 997) on a proposed contour are so close that the two curved components (995, 997) touch or approach each other in a manner that is less than a minimum requisite clearance (e.g., interference of overlap in the hatched region 993); and (2) the curved components (995, 997) are opposite curved components. Proposed arc center separation distance 954 means that the distance between centerpoints 960 and 962 of the curved components. A previous arc center separation distance 999 means that the distances between centerpoints 956 and 958 of the curved components. A minimum requisite clearance may mean that the proposed arc separation distances 999 is greater than or equal to the previous arc separation distance 999.

Opposite curved components means that one curved component is curved in an opposite manner to the other curved component. For example, an outside curved component 995 is curved oppositely with respect to an inside curved component 997. The path planner 10 resolves the interference or conflict between the opposite curved components (as illustrated in FIG. 20) by avoiding the production of a tracking contour with opposite curved components. The opposite curved components may interact to cause the tracking contour to overlap or the vehicle to make an unwanted loop.

In another embodiment the path planner 10 solves the interference problem of FIG. 20 changing the parameters of the reference row or adjacent row that is being tracked to establish a subsequent row. In still another embodiment, the path planner 10 divides the work area into two distinct coverage paths (e.g., contour coverage paths) to cover a first region and a second region. The first region covers one curved component and the second region is configured to cover an opposite component.

Figure 21A:
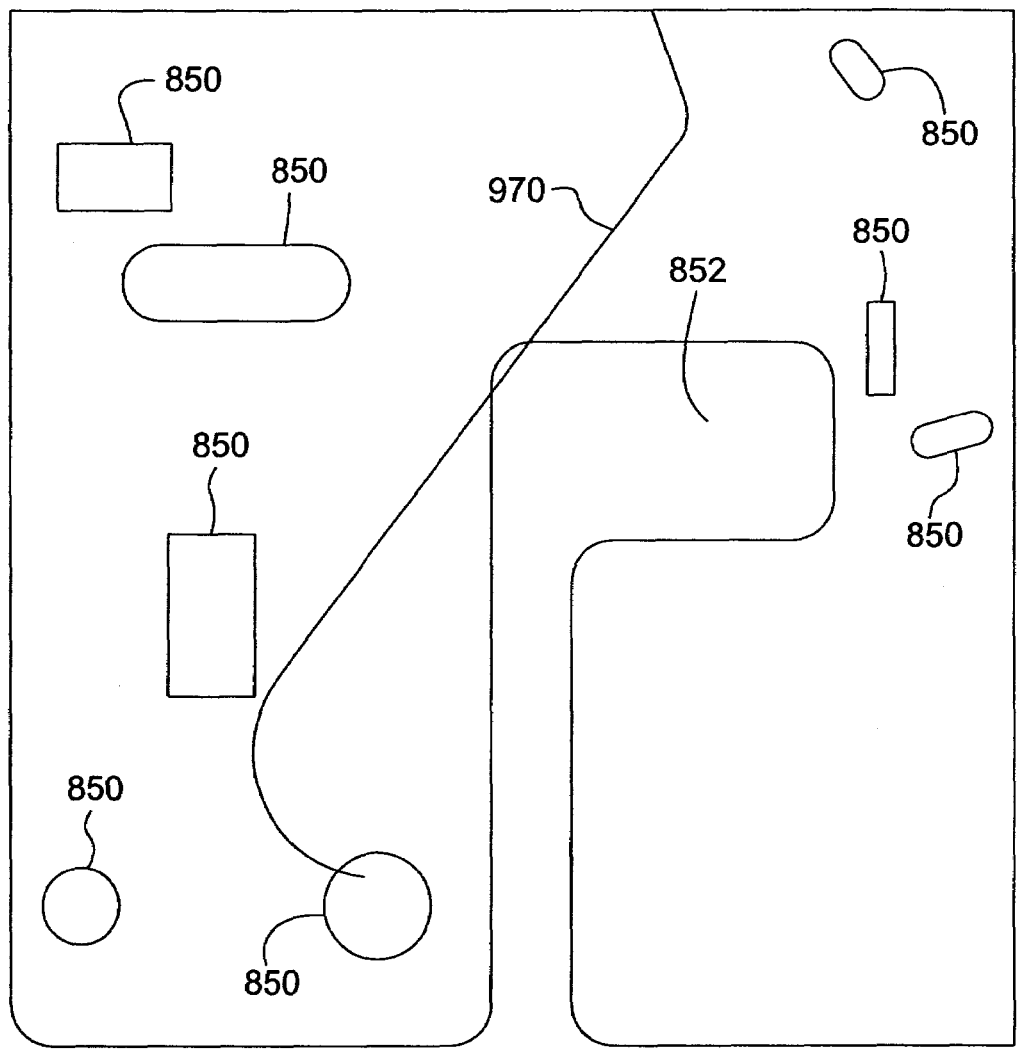
FIG. 21A illustrates a work area containing one or more obstacles or no-entry areas and having a defined reference contour row.

FIG. 21A illustrates a work area containing one or more obstacles 850 or no-entry areas 852 and having a defined reference contour row 970. The reference contour row 970 may be specified in accordance with a representation, such as linear segments and curved segments that are interconnected. The region filling module 12 or path planner 10 forms a reference contour row. The reference contour row refers to a target line which the tracking contour rows track in FIG. 21B. For example, the reference contour row of FIG. 21A is consistent with the reference contour row of step S100 of FIG. 3A.

Figure 21B:
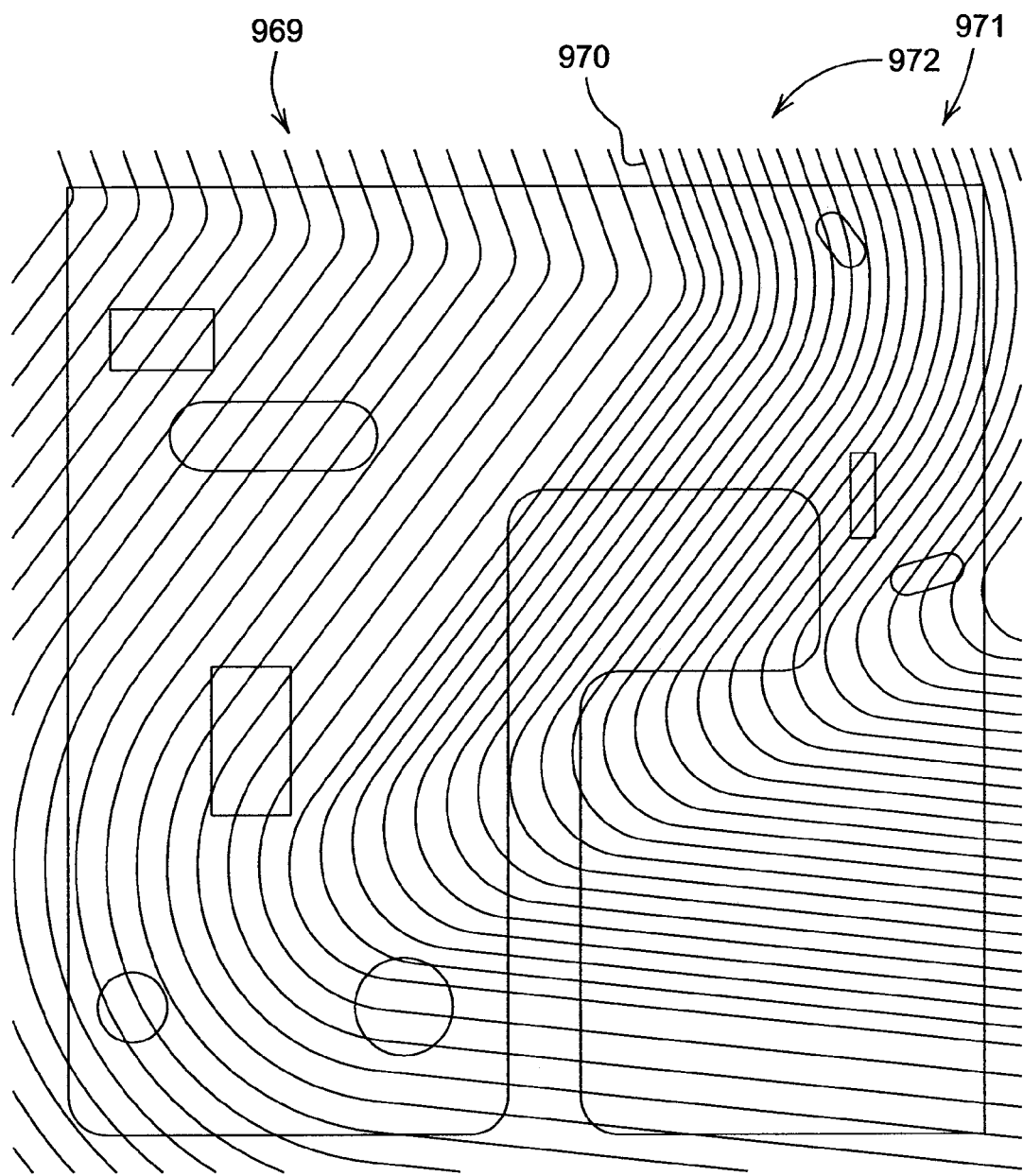
FIG. 21B illustrates the defining of transparency of contours that track the reference contour row on a first side of the reference contour row and a second side of the reference contour row.

FIG. 21B illustrates the defining of transparency 972 of contours that track the reference contour row on a first side 969 of the reference contour row and a second side 971 of the reference contour row. The reference contour 970 is tracked to create a transparency 972 that is overlaid on the work area. The routine of the region-filling module 12 will use this transparency to create the graph or candidate path plans that may be searched for a preferential contour path plan. The transparency 972 overlaps a boundary of the work area and represents an intermediate step in the formation of a contour path plan. For example, the reference contour row of FIG. 21B is consistent with the step S314 of FIG. 3A.

Figure 21C:
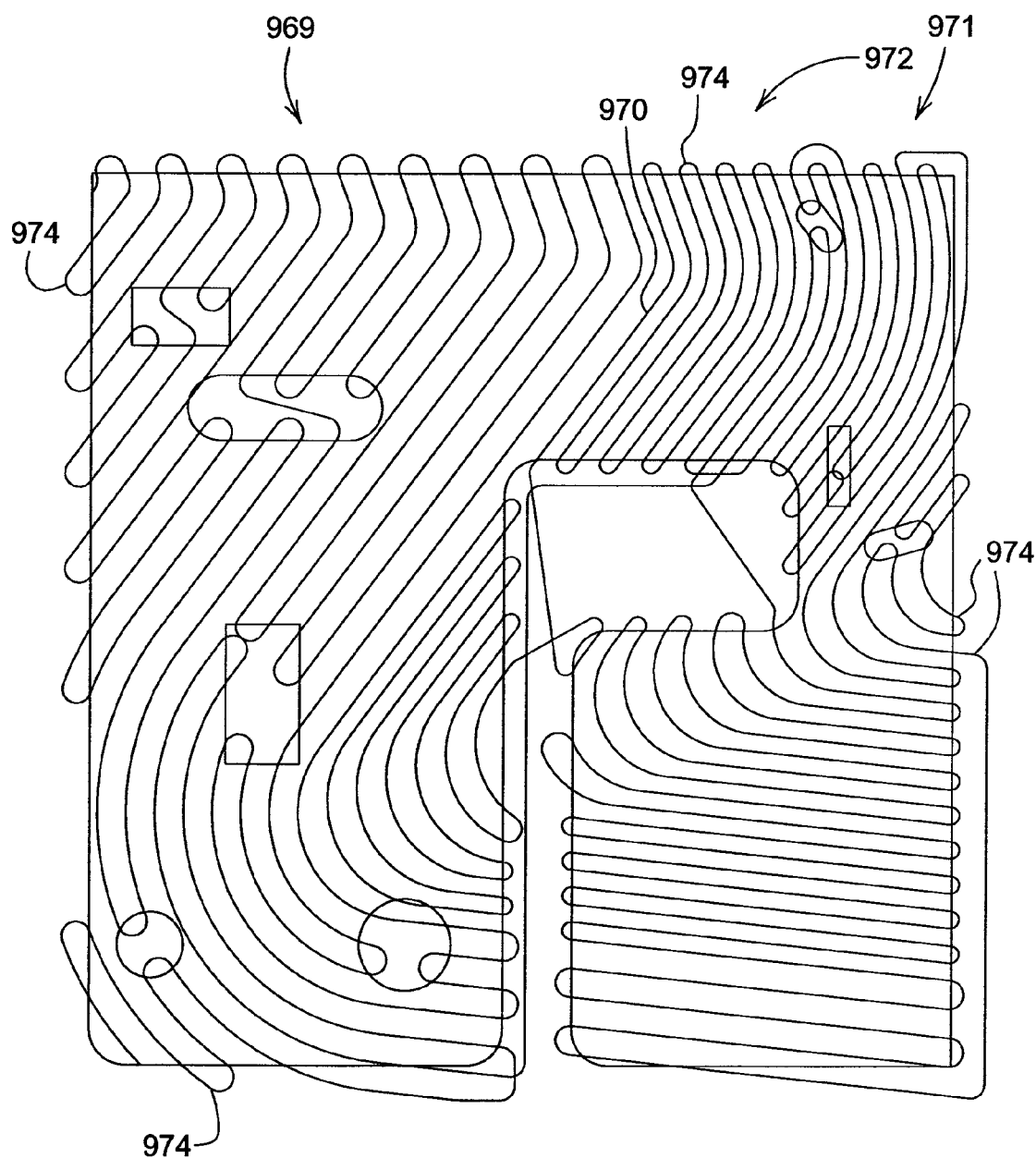
FIG. 21C illustrates a coverage solution that uses contour components to cover the work area of FIG. 21A.

FIG. 21C illustrates a coverage solution that uses contour components to cover the work area of FIG. 21A. The contour rows are interconnected with loops in a preferential order to form a generally continuous path plan of back-and-forth sweeps. The coverage solution of FIG. 21C is consistent with steps S314 through S320 of FIG. 3A, for example. The coverage solution that is produced in FIG. 21C is based on the input of the reference row contour 970 of FIG. 21A. The coverage solution was created using the turn outside option so the turns are outside the work area.

In any of the method or path planning systems disclosed herein, a data path planner 10 may invoke a fail-safe mode. In one embodiment, the fail-safe mode is described as follows. To generate a back and forth contour sweep use the region-filling routine or method of this invention as described above with the desired contour line specified in the "reference contour" array of line segments. When an invalid target line is passed, the fill area routine defaults to using a straight back and forth sweep pattern. The straight back and forth sweep will use the angle of the longest straight line in the object description as the orientation of the sweeps because this line is likely to produce longer rows and hence fewer end-of-row turns. The contour program code of the path planner 10 tries to optimize the contour rows such that the overlap between rows is minimized. However, in most cases the next contour row ill need to overlap the previous row by some distance. Overlapping the previous rows can affect the end-of-row turns by requiring a loop to complete some turns.

Figure 22:
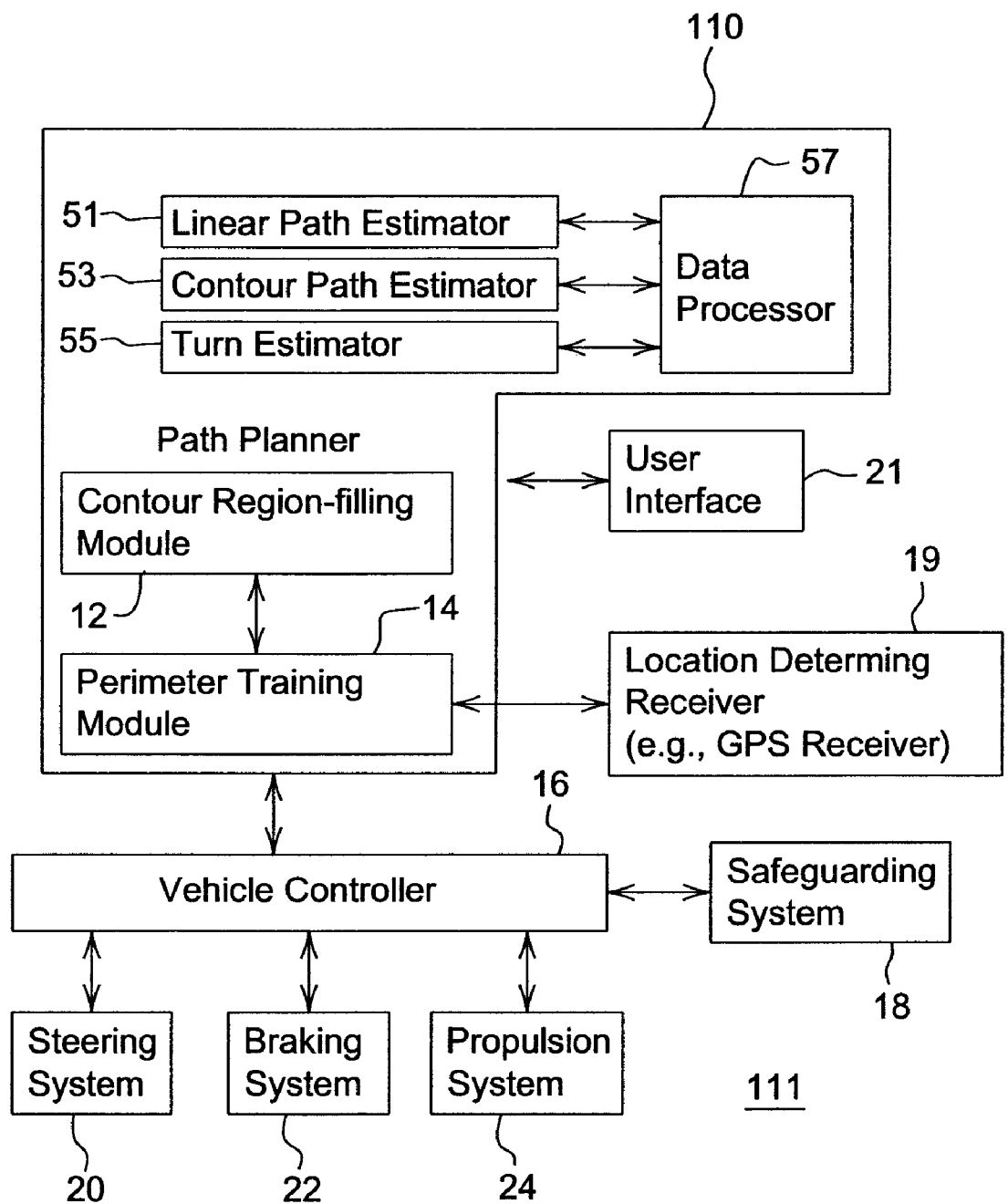
FIG. 22 is a block diagram of an alternate embodiment of a path planner for planning a path of a vehicle.

The path planner 110 of FIG. 22 is similar to the path planner 10 of FIG. 1, except the path planner 110 further comprises a linear path estimator 51, a contour path estimator 53, a turn estimator 55, and a data processor 57 for supporting the determination of whether to use a linear path plan or a contour path plan to service a defined work area. The linear path estimator 51 estimates a linear length (or linear time duration) for covering a work area with a linear coverage path. In contrast, the contour path estimator 53 estimates a contour length (or contour time duration) for covering a work area with a contour coverage path. The turn estimator 55 estimates the length (or duration) of turns for end rows to cover the work area for the linear coverage path and the contour coverage path. The data processor 57 adds the length of turns for the linear coverage pattern to the linear length to obtain a first total length and the length of turns for the contour coverage pattern to the contour length to obtain the second total length. The data processor 57 determines the shorter of the first total length or the second total length to assign a corresponding preferential path plan as the linear path plan or the contour path plan.

In an alternate embodiment, the data processor 57 determines the lesser of the first total time associated with the linear coverage path and the second total time associated with the contour coverage path, where first total time comprises the linear time duration plus the appropriate turn time duration and the second total time comprises the contour time duration plus the appropriate turn time duration. The data processor 57 may apply or recommend (e.g., via the user interface 21) a contour path plan, a linear path plan, or both to cover a particular work area. The work area may be defined by the perimeter training module 14.

Figure 23:
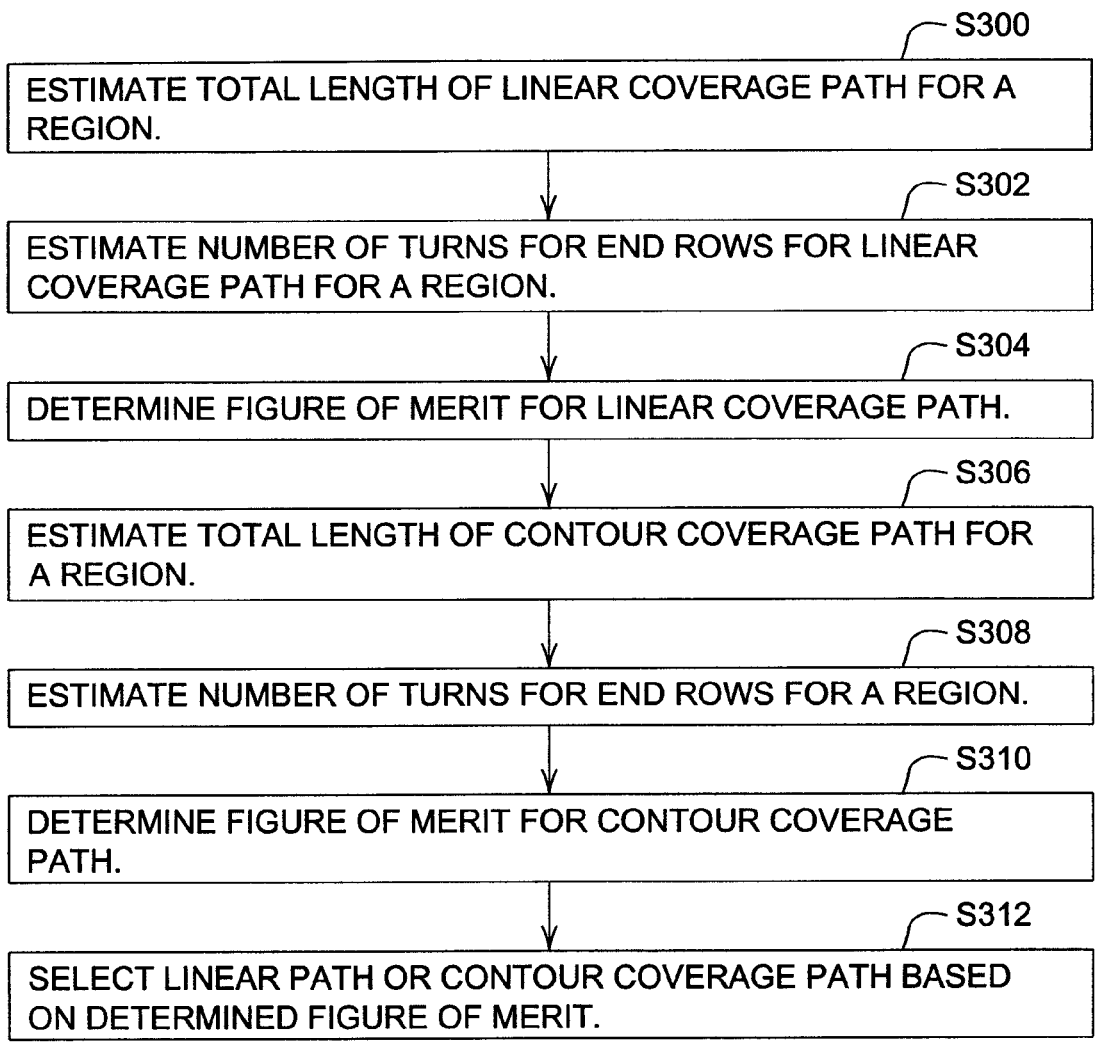
FIG. 23 is a flow chart of a method for determining whether to use a linear path plan or a contour path plan, consistent with the path planner of FIG. 22.

FIG. 23 is a method for determining whether to use a linear path plan or a contour path plan. The method of FIG. 23 begins with step S300.

In step S300, a linear path estimator 51 estimates a linear path estimate of at least one of a total length (in distance), a total elapsed time, and a total energy consumption for a vehicle to execute a linear coverage path and covers the region (e.g., work area). For example, the path estimator 51 estimates the total length or total elapsed time for the vehicle to traverse the linear path segments that cover the region (e.g., work area). For a linear coverage pattern, back and forth sweeps produce generally parallel straight lines that covers the work area. The estimator considers vehicular constrains such as turning radius, maximum speed, energy consumption, and the like.

In step S302, the turn estimator 55 estimates a first turn estimate of at least one of a total length, a total time, and a total energy consumption associated with the turns at the end of rows of the generally linear path plan. For example, the turn estimator 55 estimates the elapsed time for the vehicle to complete all of the turns (e.g., end of row turns) that support the linear coverage path of step S300. Under one procedure for carrying out step S302, a turn estimator estimates the number of turns (e.g., end row turns) required to support the linear coverage path plan and then converts the number of turns into a total turn length, a total turn time, and a total turn energy consumption.

In step S304, a data processor 57 determines a first figure of merit for a corresponding linear coverage path that covers the work area. The first figure of merit may be determined by adding the linear estimate to the corresponding first turn estimate. In one example, the first figure of merit comprises a total estimated energy consumption for a particular vehicle to complete a corresponding particular linear coverage path, which includes traversing the linear segments of step S300 and the turns of step S302. In another example, the first figure of merit comprises a total estimated time duration for a particular vehicle to complete a corresponding particular linear coverage path, which includes traversing the linear segments of step S300 and the turns of step S302. In another example, the first figure of merit comprises a total estimated length for a particular vehicle to complete a corresponding particular linear coverage path, which includes traversing the linear segments of step S300 and the turns of step S302.

In step S306, a contour path estimator 53 estimates a contour path estimate of at least one of a total length (in distance), a total elapsed time, and a total energy consumption for a vehicle to execute a contour coverage path for a region. For example, the contour path estimator 53 estimates the total length or total elapsed time for the vehicle to traverse the contour path segments that cover the region. For a curved coverage region, contour sweeps cover a region with adjacent curved paths. Such paths resemble the patterns of contour lines found on a map of a hill slope. The estimator 53 considers vehicular constrains such as turning radius, maximum speed, energy consumption, and the like.

In step S308, the turn estimator 55 estimates a second turn estimate of at least one of length, time duration and energy consumption associated with the requisite number of turns for ends of rows for the estimated contour path of step S306. For example, the turn estimator 55 estimates the elapsed time for the vehicle to complete the turns that support the contour coverage path of step S306. Under one procedure for carrying out step S308, a turn estimator estimates the number of turns (e.g., end row turns) required to support the contour coverage path plan and then converts the number of turns into a total turn length, a total turn time, and a total turn energy consumption.

In step S310, a data processor 57 determines a second figure of merit for a corresponding contour coverage path. The second figure of merit may be determined by adding the contour path estimate to the corresponding second turn estimate. In one example, the second figure of merit comprises a total estimated energy consumption for a particular vehicle to complete a corresponding particular contour coverage path, which includes traversing the contour segments of step S306 and the turns of step S308. In another example, the second figure of merit comprises a total estimated time duration for a particular vehicle to complete a corresponding particular contour coverage path, which includes traversing the linear segments of step S306 and the turns of step S308. In yet another example, the second figure of merit comprises a total estimated energy consumption of the vehicle to complete a corresponding particular contour coverage path, which includes traversing the linear segments of step S306 and the turns of step S308.

In step S312, the data processor 57 determines whether to select the linear path or the contour coverage path based on the determined first figure of merit in step S304 and the second figure of merit of step S310. If the second figure of merit is superior to the first figure of merit, then the data processor 57 may select the contour coverage path as the preferential coverage path. For example, the data processor 57 may select a preferential path with the shortest length, shortest time or the lowest energy consumption based on the determined first figure of merit in step S304 and second figure of merit of step S310. The preferential path may be the contour path plan, but need not be.

Under certain circumstances, the contour coverage path for area coverage has efficiency or energy consumption advantages over simple parallel straight lines or a linear coverage path. For example, when the contours run adjacent to a long side of the region to be covered, the contour coverage pattern tends to minimize the number of required end-of-row turns, which reduces the time needed to complete the operation. Additionally, by maximizing the length of the rows, missed areas are minimized and overlapping between rows can be minimized. The first figure of merit and the second figure of merit are intended to capture the efficiency or energy consumption advantages noted above and to support analysis thereof.

Although it is preferable that the reference contour is chosen such that the energy consumption for completion of the resultant coverage path will be minimized in accordance with the method of FIG. 23 or another technique, the user may select a contour reference path for other reasons independent of FIG. 23 or any comparison to corresponding linear paths for a region.

The method and path planning system may be used for filling a region with contour rows. It is capable of utilizing an initial reference row to produce high quality contour rows that cover a given region. The method and system is robust and produces solutions quickly, while minimizing overlap between adjacent rows and providing resolution of potential nonconformities and path formation rule violations.

Having described the preferred embodiment, it will become apparent that various modifications can be made without departing from the scope of the invention as defined in the accompanying claims.

What is claimed is:

1. A method for planning a path of a vehicle, the method comprising:
    defining a reference row having a reference contour in a work area;
    establishing a representation of the defined reference row, the reference row comprising at least one of a generally curved component and a generally linear component, wherein the representation comprises one or more critical points of material directional change of the vehicle, each critical point defined by a pair of location data and a corresponding heading, each pair assigned a sequence for traversing the critical points; and
    generating one or more contour rows with a tracking contour that tracks or mirrors the reference contour based on a vehicular width and a radius difference parameterassociated with the curved component.

2. The method according to claim 1 wherein the representation of the curved component comprises an arc segment and wherein the linear component comprises a linear segment.

3. The method according to claim 2 wherein the establishing of the representation comprises defining the arc segment as a center point, a start point, an end point and a radius, where the arc segment has a radius greater than the minimum turning radius of the vehicle; wherein the establishing of the representation comprises defining the linear segment as two points.

4. The method according to claim 1 wherein the representation comprises one or more corners defined by location data and a sequence for traversing the corners.

5. The method according to claim 1 wherein the defining further comprises defining the reference row having a reference contour that follows along a boundary contour of a boundary of the work area.

6. The method according to claim 1 wherein if the radius difference parameter generally equals the vehicular width, a nesting solution applies to adjacent rows on a local basis.

7. The method according to claim 1 further comprising:
    identifying the presence of two adjacent outside arcs separated by a linear segment in an outer contour row located toward an outer boundary of the work area; and
    determining a single outside arc for an inner contour row that tracks the outer contour row, the inner contour row located closer to an interior of the work area than the outer contour row.

8. The method according to claim 1 further comprising:
    identifying a presence of an inside arc and outside arc being adjacent to each other, in a proposed contour row where such inside arc and outside arc would cross over each other; and
    applying an iterative repair process to reformulate the proposed contour row.

9. The method according to claim 1 wherein generating comprises applying a search algorithm to possible candidate values of the radius difference parameter, wherein the search space is limited such that search is started with the radius difference parameter equal to the vehicular width and the radius difference parameter is decreased therefrom.

10. The method according to claim 1 further comprising:
    determining a first figure of merit for a corresponding linear coverage path for covering a work area, the first figure of merit indicating at least one of a total energy consumption, a total distance, or a total time duration of the vehicle for completing the linear coverage path;
    determining a second figure of meritfor a corresponding contour coverage path for covering the work area, at least one of a total energy consumption, a total distance, or a total time duration of the vehicle for completing the contour coverage path;
    selecting the contour coverage path if the second figure of merit is superior to the first figure of merit.

11. The method according to claim 10 wherein the determining of the first figure of merit further comprises:
    estimating a total length in distance for the vehicle to execute a linear coverage path for the work area; and
    estimating the number or corresponding length of turns at the end of rows for the linear coverage path.

12. The method according to claim 11 wherein the determining of the second figure of merit further comprises:
    estimating a total length in distance for the vehicle to execute a contour coverage path for the work area; and
    estimating the number or corresponding length of turns at the end of rows for the contour coverage path.

13. A path planner for planning a path of a vehicle, the path planner comprising:
    a definer for defining a reference row having a reference contour in a work area;
    a representation former for establishing a representation of the defined reference row, the representation comprising an arc segment and at least one of a linear segment and a transition; and
    a generator for generating one or more contour rows with a tracking contour that tracks or mirrors the reference contour based on a vehicular width and a radius difference parameter associated with the arc segment; the contour rows generated by at least one of a translation technique, a radius modification technique, and a hybrid technique; where the generator comprises a radius modifier for selecting the radius difference parameter such that if the radius difference parameter generally equals the vehicular width, a nesting solution applies to adjacent rows on a local basis.

14. The path planner according to claim 13 wherein the definer defines the reference row having a reference contour that follows along a boundary contour of a boundary of the work area.

15. The path planner according to claim 14 wherein the reference row is contiguous with the boundary.

16. The path planner according to claim 13 wherein the definer defines a reference row that does not track a boundary of the work area.

17. The path planner according to claim 13 wherein the representation former defines the arc segment as a center point, a start point, an end point and a radius, where any arc segment has a radius greater than the minimum turning radius of the vehicle.

18. The path planner according to claim 13 wherein the representation former defines the linear segment as two points.

19. The path planner according to claim 13 further comprising:
an interference module for identifying the presence of two adjacent outside arcs separated by a linear segment in an outer contour row located toward an outer boundary of the work area; and the interference module determining a single outside arc for an inner contour row that tracks the outer contour row, the inner contour row located closer to an interior of the work area than the outer contour row.

20. The path planner according to claim 13 further comprising:
an interference module for identifying a presence of an inside arc and outside arc being adjacent to each other, in a contour row where such inside arc and outside arc would cross over each other; and the interference module applying an iterative repair process to reformulate the contour row.

21. The path planner according to claim 13 wherein generator further comprises a search engine for applying a search algorithm to possible candidate values of the radius difference parameter, wherein the search space is limited such that search is started with the radius difference parameter equal to the vehicular width and the radius difference parameter is decreased therefrom.

22. The path planner according to claim 13 further comprising:
a linear path estimator for estimating a linear path estimate of at least one of a total length, a total time, and a total energy consumption for a vehicle to execute a generally linear path plan;
a contour path estimator for estimating a contour path estimate of at least one of a total length, a total time, and a total energy consumption for a vehicle to execute a generally contour path plan;
a turn estimator for estimating turn estimates of at least one of a length, time duration and energy consumption associated with the turns at end of rows of the generally linear path plan and the contour path plan;
a data processor for determining a first figure of merit for the corresponding linear path and for determining a second figure of merit for the corresponding contour path plan based on the linear path estimate, the contour path estimate, and the turn estimates; the data processor adapted to select the contour coverage path if the second figure of merit is superior to the firstfigure of merit.

* * * * *